United States Patent
Brady et al.

(10) Patent No.: US 9,774,824 B1
(45) Date of Patent: Sep. 26, 2017

(54) SYSTEM, METHOD, AND LOGIC FOR MANAGING VIRTUAL CONFERENCES INVOLVING MULTIPLE ENDPOINTS

(71) Applicant: CISCO TECHNOLOGY, INC., San Jose, CA (US)

(72) Inventors: Finbarr Andrew Brady, Kilcolgan (IE); Shane Martin Hannon, County Galway (IE); Austin Keogh, Galway (IE)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/213,222

(22) Filed: Jul. 18, 2016

(51) Int. Cl.
| | |
|---|---|
| H04N 7/15 | (2006.01) |
| H04L 29/08 | (2006.01) |
| H04L 29/06 | (2006.01) |
| H04W 4/06 | (2009.01) |
| H04W 4/00 | (2009.01) |
| H04N 7/14 | (2006.01) |

(52) U.S. Cl.
CPC ......... *H04N 7/152* (2013.01); *H04L 65/1069* (2013.01); *H04L 65/403* (2013.01); *H04L 67/18* (2013.01); *H04N 7/147* (2013.01); *H04W 4/008* (2013.01); *H04W 4/06* (2013.01)

(58) Field of Classification Search
CPC .. H04N 7/152; H04N 7/147; H04N 2007/145; H04L 67/18; H04L 65/1069; H04L 65/403; H04L 12/1813; H04L 29/06414; H04L 12/1822; H04L 12/1827; H04L 2012/2849; H04W 4/06; H04W 4/008; H04M 3/56; H04M 3/567; H04M 2201/50
See application file for complete search history.

(56) References Cited

U.S. PATENT DOCUMENTS

| | | | |
|---|---|---|---|
| 7,929,678 B2 | 4/2011 | Shaffer et al. | |
| 8,594,291 B2 | 11/2013 | Bieselin et al. | |
| 8,797,379 B2 | 8/2014 | Ogle et al. | |

(Continued)

FOREIGN PATENT DOCUMENTS

| | | | | |
|---|---|---|---|---|
| ES | EP 3070876 A1 * | 9/2016 | ............ | H04N 7/152 |

OTHER PUBLICATIONS

Techzine, "The Future of call routing with NewAer technology," TechZine, Alcatel-Lucent, Sep. 9, 2014, 3 pages; http://insight.nokia.com/future-call-routing-newaer-technology.

*Primary Examiner* — Stella Woo

(57) ABSTRACT

Approaches are disclosed for reducing a number of connections established by a server for a virtual meeting session. In some embodiments, the server receives a request to initiate a virtual meeting session involving a plurality of endpoints. The server may determine a location identifier for each of the plurality of endpoints based on location data generated by each of the plurality of endpoints. When the server determines that two or more of the plurality of endpoints are co-located at a location based on the location identifier, it can automatically establish only one connection on behalf of the two or more of the plurality of endpoints. The connection may be established to, e.g., a nearby conferencing device or one of the endpoints that are in the same location. The device or endpoint to which the connection is established may be determined based on which device or endpoint historically initiates virtual meetings.

20 Claims, 12 Drawing Sheets

(56) References Cited

U.S. PATENT DOCUMENTS

| | | | |
|---|---|---|---|
| 9,231,775 B2 | 1/2016 | Bozionek et al. | |
| 9,338,400 B1 * | 5/2016 | Krishnan | H04N 7/152 |
| 2004/0207719 A1 | 10/2004 | Tervo et al. | |
| 2007/0030808 A1 | 2/2007 | Croak et al. | |
| 2007/0036317 A1 * | 2/2007 | Shaffer | H04M 3/42348 |
| | | | 379/202.01 |
| 2012/0127263 A1 * | 5/2012 | Ogle | H04L 12/1827 |
| | | | 348/14.09 |
| 2012/0265810 A1 * | 10/2012 | Reid | H04L 65/80 |
| | | | 709/204 |
| 2013/0198635 A1 | 8/2013 | Jones et al. | |
| 2015/0097922 A1 * | 4/2015 | Le Devehat | H04L 65/1069 |
| | | | 348/14.08 |
| 2015/0181165 A1 * | 6/2015 | Iltus | H04N 7/15 |
| | | | 348/14.09 |
| 2015/0312696 A1 * | 10/2015 | Ribbich | H04W 4/043 |
| | | | 455/418 |
| 2015/0349971 A1 * | 12/2015 | Sinha | H04L 63/0428 |
| | | | 370/260 |
| 2016/0095141 A1 | 3/2016 | Ma et al. | |

* cited by examiner

US 9,774,824 B1

SYSTEM, METHOD, AND LOGIC FOR MANAGING VIRTUAL CONFERENCES INVOLVING MULTIPLE ENDPOINTS

TECHNICAL FIELD

The present disclosure relates generally to network systems and, more particularly, to managing virtual conferences/meeting involving multiple endpoints.

BACKGROUND

Virtual meetings (also called conferences) provide users with the ability to use various endpoints to communicate with one another in a meeting environment though the users (and their respective endpoints) are located remote from one another. Increased popularity of such virtual meetings has led to many users utilizing virtual meetings as the primary way in which they meet with other users, whether the meetings are planned (e.g., days, weeks, hours) in advance or organized in an ad-hoc fashion (e.g., e.g., planned based on immediate need to meet with the individuals and not in advance).

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
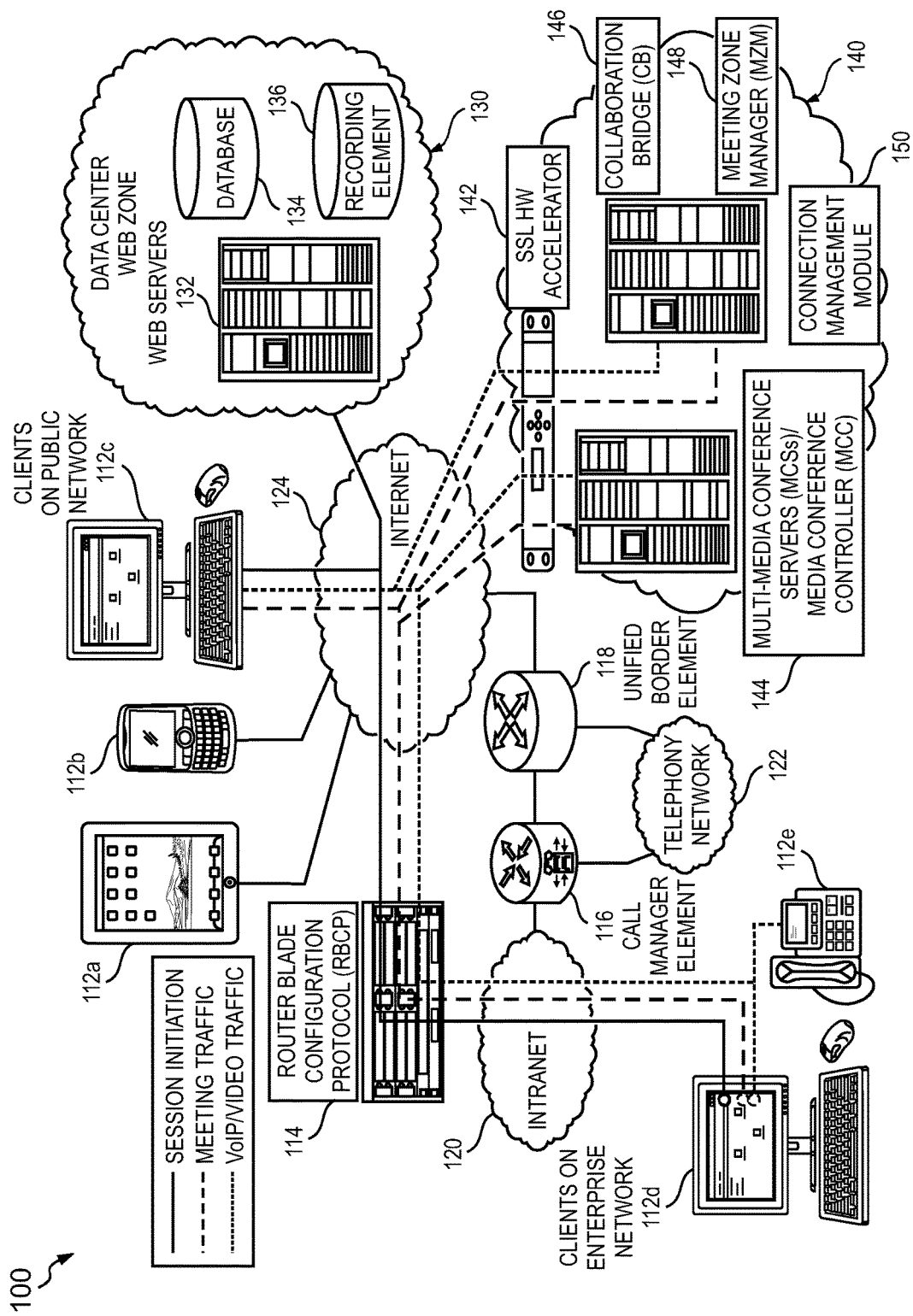
FIG. 1 is a simplified schematic diagram of a communication system for managing virtual meetings in accordance with some embodiments of the present disclosure.

In some examples. a method comprises: receiving, from an endpoint, a request to initiate a virtual meeting session involving a plurality of endpoints; reducing a number of connections established by a server for the virtual meeting session by: determining a location identifier for each of the plurality of endpoints based on location data generated by each of the plurality of endpoints; and when it is determined that two or more of the plurality of endpoints are co-located at a location based on the location identifier, establishing only one connection to the server on behalf of the two or more of the plurality of endpoints.

In other examples, an apparatus comprises at least one network interface configured to receive, from an endpoint, a request to initiate a virtual meeting session involving a plurality of endpoints; one or more processor operably coupled to the at least one network interface and a connection management module; the connection management module comprising instructions that, when executed by the one or more processor, reduce a number of connections established by the apparatus for the virtual meeting session by performing operations comprising: determining a location identifier for each of the plurality of endpoints based on location data generated by each of the plurality of endpoints; and when it is determined that two or more of the plurality of endpoints are co-located at a location based on the location identifier, establishing only one connection to the apparatus on behalf of the two or more of the plurality of endpoints.

In further examples, a computer-readable non-transitory medium comprises instructions, that when executed by at least one processor configure the at least one processor to perform operations comprising: receiving, from an endpoint, a request to initiate a virtual meeting session involving a plurality of endpoints; reducing a number of connections established by a server for the virtual meeting session by: determining a location identifier for each of the plurality of endpoints based on location data generated by each of the plurality of endpoints; and when it is determined that two or more of the plurality of endpoints are co-located at a location based on the location identifier, automatically establishing only one connection to the server on behalf of the two or more of the plurality of endpoints.

Example Embodiments

Some virtual meeting systems alert each endpoint that is to be involved in a virtual meeting session when the virtual meeting session begins. In such systems, all of the endpoints associated with the virtual meeting session are notified of the start of the meeting via a virtual meeting client. For example, all of the endpoints may ring, vibrate, generate pop-up windows, or otherwise generate alerts. When each of the endpoints is located in the same location (e.g., single room) such simultaneous alerts at the start of a meeting can degrade the user experience. For example, each co-located endpoint being alert to the start of the meeting can confuse and distract a user from deciding how to and who should joins the virtual meeting. A virtual meeting server may use significant computational resources to generate and transmit such notifications to each of the individual endpoints. Moreover, if each of the endpoints chooses to join the virtual meeting, each is individually connected to the virtual meeting session. Such multiple connections further exacerbate the problem of large computational demand on the virtual meeting server. The number of connections and alerts generated by the virtual meeting server can reduce the operational efficiency of the server and slow meeting services for many endpoints.

The methods, systems, logic, and/or apparatuses (as disclosed herein) can address the above technical problem (and others) by reducing the number of connections established by the meeting management server for the virtual meeting session. For example, upon receiving a request to initiate a virtual meeting session involving multiple endpoints, a location for each of the endpoints can be determined to identify whether any of the endpoints are proximate to the same location (i.e., whether they are co-located). Moreover, the location is determined for all devices associated with all users involved in the virtual meeting (and not only for devices associated with a single user). When it is determined that two or more the endpoints are co-located (i.e., are in a same location), a single connection is established to the virtual meeting session on behalf of the co-located endpoints. The single connection can be used to connect to one of the co-located endpoints (on behalf of others of the co-located endpoints) or to a nearby conferencing device (on behalf of all of the co-located endpoints). Consequently, the number of connections required for the virtual meeting is reduced. In addition, the user experience is improved by reducing the number of simultaneous alerts sent to co-located endpoints.

The term 'endpoint' is inclusive of devices used to initiate a communication, such as a computer, a personal digital assistant (PDA), a laptop or electronic notebook, a cellular telephone (e.g., an IPHONE, an IP phone, a BLACKBERRY, a GOOGLE DROID), a tablet (e.g., an IPAD), or any other device, component, or object capable of initiating voice, audio, video, media, and/or data exchanges within system 100 (described below). An endpoint may also be inclusive of a suitable interface to a human user, such as a microphone, a display, or a keyboard or other input/output (I/O) terminal equipment. An endpoint may also be any device that seeks to initiate a communication on behalf of another entity or element, such as a program, a conferencing device, a database, or any other component, device, element, or object capable of initiating an exchange within the system 100. Furthermore, endpoints can be associated with individuals, clients, customers, or end users. Data, as used herein in this document, refers to any type of numeric, voice, messages, video, media, or script data, or any type of source or object code, or any other suitable information in any appropriate format that may be communicated from one point to another.

FIG. 1 is a simplified block diagram illustrating a communication system 100 for configuring multichannel video data in a meeting session environment. In specific implementations, communication system 100 can be provisioned for use in generating, managing, hosting, and/or otherwise providing virtual meetings. In certain scenarios (many of which are detailed below), communication system 100 may be configured for improving the efficiency of a server managing connections for the virtual meeting session. The architecture of communication system 100 is applicable to any type of conferencing or meeting technology such as video conferencing architectures (e.g., Telepresence™), web cam configurations, smartphone deployments, personal computing applications (e.g., Skype™), multimedia meeting platforms (e.g., MeetingPlace™, WebEx™, other virtual meeting client, etc.), desktop applications, or any other suitable environment in which video data is sought to be managed.

Communication system 100 may include any number of endpoints 112a-k (of FIGS. 1 and 2) that can achieve suitable network connectivity via various points of attachment. Endpoints 112a-k are representative of any type of client or user wishing to participate in a meeting session in communication system 100 (e.g., or in any other online platform). Furthermore, endpoints 112a-k can be associated with individuals, user profiles, clients, customers, or end users wishing to participate in a meeting session in communication system 100 via some network. In this particular example, communication system 100 can include an Intranet 120, a telephony network 122, and an Internet 124, which (in this particular example) offers a pathway to a data center web zone 130 and a data center meeting zone 140. Telephony network 122 may include, among other things, a voice over Internet protocol (VoIP) gateway and a public switched telephone network (PSTN). Endpoint 112e includes a telephony module for communicating with telephony network 122.

Data center web zone 130 includes a plurality of web servers 132, a database 134, and a recording element 136. Data center meeting zone 140 includes a secure sockets layer hardware (SSL HW) accelerator 142, a plurality of multimedia conference servers (MCSs)/media conference controller (MCC) 144, a collaboration bridge 146, a meeting zone manager 148, and a connection management module 150. As a general proposition, each MCS can be configured to coordinate video and voice (i.e., audio) traffic for a given online meeting. Additionally, each MCC can be configured to manage the MCS from data center meeting zone 140. Each of endpoints 112a-k can be provisioned with one or more virtual meeting applications.

A virtual meeting application may comprise, e.g., a virtual meeting client operable (e.g., by an endpoint) to establish a connection to a virtual meeting session. A connection management module 150 is operable to facilitate (e.g., establish or prevent establishment of) connections and data transfer with between endpoints and/or conferencing devices, as the case may be. Semantically, the virtual meeting application is a client and server application. In some embodiments, the virtual meeting application may be a web-based application. A client module can be loaded onto an end user's endpoint via one or more webpages. A software module (e.g., a plug-in application, or an stand-alone application) can be delivered to respective endpoints via the webpages. The software can be downloaded (or suitably updated) before participating in the meeting. If the software module were already resident on the endpoint (e.g., previously downloaded, provisioned through any other type of medium (e.g., compact disk (CD))), then while attempting to participate in a virtual meeting, that software module would be called to run locally on the endpoint. This allows a given endpoint to establish a communication with one or more servers (e.g., provisioned at data center meeting zone 140 and/or data center web zone 130) for connecting to virtual meetings.

Note that various types of routers and switches can be used to facilitate communications amongst any of the elements of FIG. 1. For example, a call manager element 116 and a unified border element 118 can be provisioned between telephony network 122 and Intranet 120. The call manager element is a network manager for IP phones and other network-connected conferencing devices. Also depicted in FIG. 1 are a number of pathways (e.g., shown as solid or broken lines) between the elements for propagating meeting traffic, session initiation, and voice over Internet protocol (VoIP), audio, and/or video traffic.

Intranet 120, telephony network 122, and Internet 124 represent a series of points or nodes of interconnected communication paths for receiving and transmitting packets of information that propagate through communication system 100. These networks may offer connectivity to any of the devices or endpoints of FIG. 1. Moreover, Intranet 120, telephony network 122, and Internet 124 offer a communicative interface between sites (and/or participants, rooms, etc.) and may be any local area network (LAN), wireless LAN (WLAN), metropolitan area network (MAN), wide area network (WAN), extranet, Intranet, virtual private network (VPN), virtual LAN (VLAN), or any other appropriate architecture or system that facilitates communications in a network environment.

Intranet 120, telephony network 122, and Internet 124 can support a transmission control protocol (TCP)/IP, or a user datagram protocol (UDP)/IP in particular embodiments of the present disclosure. Alternatively, Intranet 120, telephony network 122, and Internet 124 may implement any other suitable communication protocol for transmitting and receiving data packets within communication system 100. Note also that Intranet 120, telephony network 122, and Internet 124 can accommodate any number of ancillary activities, which may accompany a virtual meeting session. This network connectivity can facilitate all informational exchanges (e.g., chats, lists of participants, notes, virtual whiteboards, PowerPoint presentations, e-mailing, word-processing applications, audio, video, etc.). Along similar reasoning, Intranet 120, telephony network 122, and Internet 124 can foster all such communications and, further, be replaced by any suitable network components for facilitating the propagation of data between participants in a conferencing session.

Static data can be stored in data center web zone 130. For example, the scheduling data, the login information, the branding for a particular company, the schedule of the day's events, etc. can all be provided in data center web zone 130. Once a virtual meeting has begun, any meeting experience information can be coordinated (and stored) in data center meeting zone 130 and/or 140. For example, if an individual were to share a document, or to pass the ball (i.e., pass control of the meeting), then that meeting experience would be managed by data center meeting zone 140 and recorded by recording element 136. The database 134 records metadata regarding the meeting, which may later be used to select an endpoint with which to establish a connection on behalf of other endpoints. The database 134 may record a log of each virtual meeting session including an identifier of each of the endpoints and/or users invited to the meeting in the virtual meeting session, an identifier of each of the endpoints and/or users joined the meeting in the virtual meeting session, location information for each of the users who joined the meeting, an indication of whether one endpoint (or user) joined the meeting on behalf of other endpoints (or users) involved in the virtual meeting session, the endpoint and/or user who initiated the meeting session. In a particular implementation, data center meeting zone 140 is configured to coordinate the connection management activities with endpoints 112*a-k* (e.g., via software modules).

In order to initiate joining a virtual meeting, a device (e.g., an endpoint or a conferencing device) may connect to any point of attachment. Hence, a client (e.g., a virtual meeting client) on the device can perform appropriate operations to initiate a new virtual meeting session or join an existing virtual meeting (regardless of whether the meeting is scheduled or unscheduled (e.g., impromptu)). The endpoint can be redirected to data center meeting zone 140 (as shown in FIG. 1). The meeting zone manager 148 can direct the device to connect to a specific collaboration bridge server for joining the upcoming meeting. If the meeting has audio and/or video streams, then the endpoint also connects to a given server (e.g., an MCS) to receive those streams. The client is operably connected to the meeting (i.e., has completed joining the meeting) when the client is connected to the virtual meeting session (e.g., only by voice, only by video, or by integrated voice and video). Upon joining the virtual meeting session, the virtual meeting client may receive a communications data stream in the meeting session. The communications data stream may include video data, audio data, chat data, and/or other communications data from other participants (via other devices) in the meeting session. At this point, the virtual meeting client may be connected to a server (e.g., Media Conference Server 144), which connects the client to clients on other devices that have joined the virtual meeting. A stream of communications data (i.e., a communications data stream) may be provided from the server to the endpoint (e.g., via the connection management module). As the virtual meeting begins, a meeting host may initially have control of the virtual meeting (i.e., by default). The virtual meeting is operational between the endpoint and other endpoint devices (or conferencing devices), which followed a similar initiation protocol to join the virtual meeting.

Figure 2:
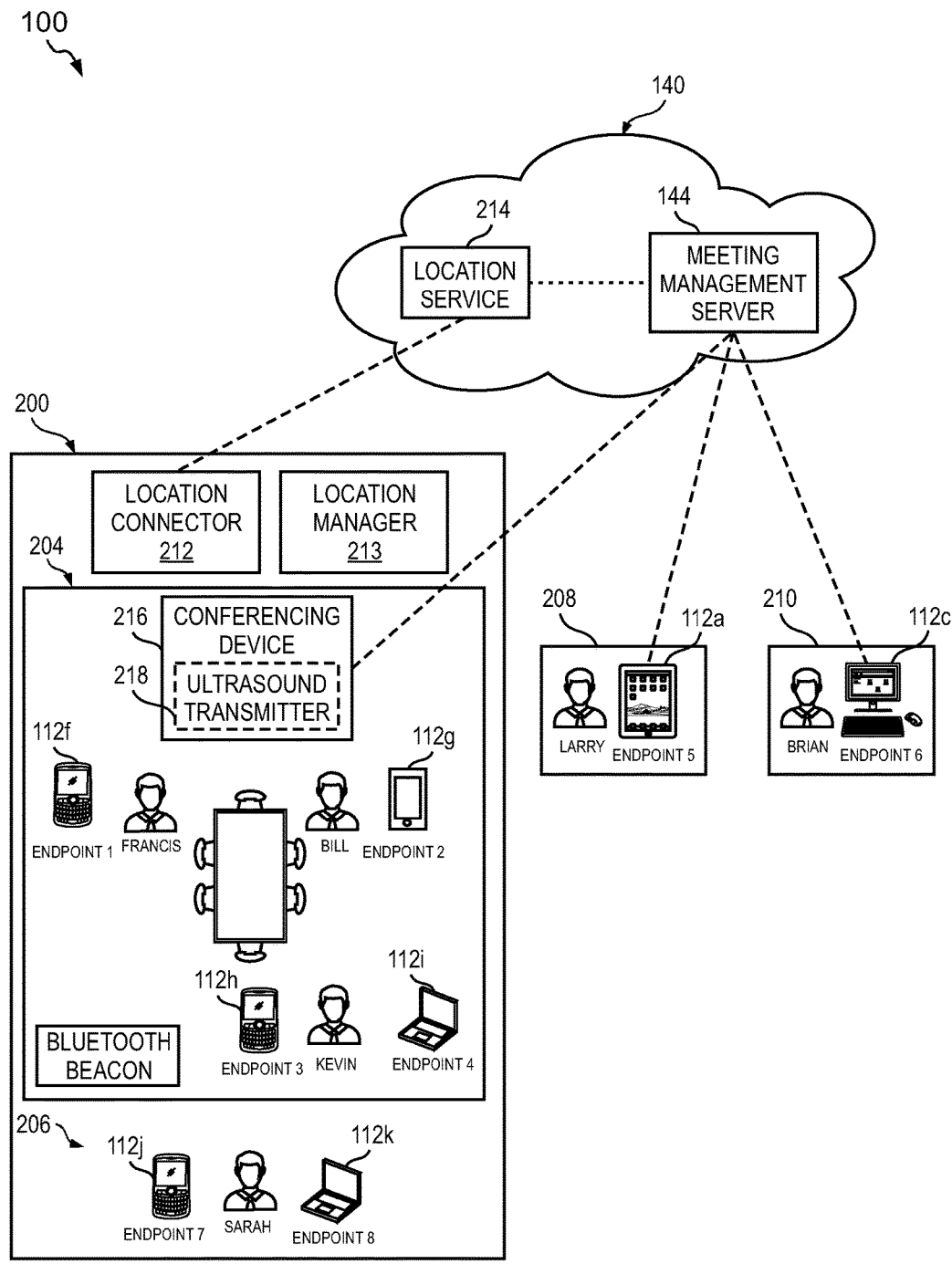
FIG. 2 is simplified diagram illustrating the virtual meeting management system of FIG. 1 managing multiple endpoints involved in a virtual meeting.

FIG. 2 is simplified diagram illustrating the virtual meeting management system of communication system 100 for managing multiple endpoints involved in a virtual meeting. In the example of FIG. 2, the communication system 100 operates in the context of building 200 and locations 208 and 210. The building and each of the locations 208 and 210 are remote from one another. In this example, the building 200 includes a location connector 212, a location manager 213, a room 204, and a location 206 (i.e., outside of the room 204). The room 204 is provisioned with at least one conferencing device 216 and a Bluetooth beacon 220. Several users are located in the room 204 and one user is at location 206. In this example, the users Francis, Bill, and Kevin are each located in the room 204; and the user Sarah is at location 206. Each of the users is carrying one or more devices: Francis is carrying endpoint 112*f* (i.e., endpoint 1); Kevin is carrying endpoints 112*h* and 112*i* (i.e., endpoints 3 and 4); Bill is carrying endpoint 112*g* (i.e., endpoint 2); and Sarah is carrying endpoints 112*j* and 112*k* (i.e., endpoints 7 and 8). The user Larry is at location 208 and is carrying endpoint 112*a* (i.e., endpoint 5). The user Brian is at location 210 and is carrying endpoint 112*b* (i.e., endpoint 6).

The location service 214 manages location data received directly from an endpoint, from devices that have detected the endpoint, and/or from other sources of location data. In the example of direct communication between the location service 214 and an endpoint, a virtual meeting client on the endpoint may transmit location data retrieved from one or more wireless communication devices on the endpoint (e.g., coordinates from GPS sensors/receivers, device identifiers from wireless transceivers, such as Bluetooth transmitters, ultrasound transmitters, the like). In such an example, the endpoint determines location data (e.g., data retrieved from GPS, Ultrasound, Bluetooth, or other wireless communication devices) for itself and transmits the location data directly to the location service 214. In the example of other devices detecting the endpoint, wireless access points within the building can receive connections from (or detect mobile device signals from) the endpoint. The wireless access points report to the location manager 213 data identifying the various endpoints. The location manager 213 is a building specific dataset (e.g., database) that includes location information for network access points within the building 200. The location manager 213 uses the location information for the network access points to manage location data for all devices connected to network access points located within the building 200 (e.g., regardless of whether an endpoint is executing a virtual meeting client). For example, the location manager 213 may calculate an estimated location of an endpoint based on the endpoint being detected by multiple wireless access points (e.g., triangulation based, at least in part, on know locations of the wireless access points). As each of the wireless access points receives connections from various endpoints in the building, the wireless access points report data identifying the various endpoints to the location manager 213. The location manager 213 can use a mapping of device identifiers (for each of the wireless access points) to corresponding location identifiers, the location of the an endpoint can be estimated based, at least in part, on the location identifier for the wireless access point reporting data identifying the endpoint. The location manager 213 transmits to the location service 214 location data that was generated by the on-site location manager 213. The location connector 212 can push to the location service 214 location data for a subset of endpoints (e.g., only those executing virtual meeting clients) or for all endpoints detected within the building 200. In such an example, a device other than the endpoints (in this case the device is a network access point device) transmits location data to the location service 214 (i.e., via the location manager 213 and the location connector 212). The location service 214 synthesizes all the location data from the multitude of sources (endpoints, other devices) and may further correlate data identifying individual endpoints to a particular user. Thus, while the location manager 213 collects data related to individual endpoints, the location service 214 aggregates data from multiple endpoints and further identifies users associated with the devices (e.g., using user profile data). Moreover, because the location service 214 aggregates data for multiple devices associated with a single individual, the location service 214 may select from multiple sources of location data based on the accuracy of the sources (e.g., using the most accurate data and/or the data assigned the highest weight based on detection range). The meeting management server 144 may utilize location information for the endpoints and/or users to determine whether multiple connections or a single connection should be established to connect the endpoints and/or users to a virtual meeting session.

'Location data' is usable to identify (or estimate) the location of an endpoint. Ultimately, the location data is related to a location identifier, which approximates the location of the endpoint. In some cases, the location data is retrieved by the endpoint from another device. For example, a device identifier sensed by the wireless communication devices on the endpoint. In some cases, the device identifiers are received wirelessly from wireless transceivers, such as Bluetooth transmitters, ultrasound transmitters, and the like (e.g., ID of Bluetooth beacon, ID of Wi-Fi access point ID, ID of conferencing device, ID of the endpoint). In other cases, the location data is a coordinate (e.g., latitude, longitude, and/or elevation) retrieved, at least in part, from a GPS satellite. In other examples, the location data is not directly detected by endpoint and is, instead, detected by another device. For example, a network access point may detect the presence of the endpoint and transmit an identifier that identifies the endpoint to a location service. In this case, the location data is the device identifier of the network access point. The system may use the device identifier to lookup a known location for the network access point and estimate the location of the endpoint based on the known location of the network access point. Thus, in general, a location data may be any data information that can be synthesized to determine or estimate the location of the endpoint.

Each of the users is associated with at least one device. For example, each of the users may have a user profile associated with a virtual meeting client that identifies the user (e.g., name, title, an email address, login ID, and the like) and relates the user to one or more endpoints (e.g., using identifiers corresponding to the endpoints such as phone number, MAC address, IP address, and the like). In the example of FIG. 2, each of the users has a user profile that is used to login to a virtual meeting client running on their corresponding endpoints. Such user profiles are utilized within the virtual meeting client to alert one or more endpoints associated with the user, e.g., when the user is invited to a meeting.

The conferencing device 216 is configured to receive, via a virtual meeting session, communication data streams from the meeting manager server 144 in the data center within zone 140. In one example, the conferencing device 216 is a VoIP phone with video capabilities, a web connected teleconferencing device (e.g., a TELEPRESENCE device marketed by CISCO), and/or other device capable of rendering audio and/or video streams from the meeting manager server 144. In this example, the conferencing device 216 includes an ultrasound transmitter 218. The ultrasound transmitter 218 can repeatedly broadcast an (inaudible) ultrasonic signal. The ultrasonic signal encodes an identifier of the conferencing device 216. An identifier may include a URL, a Mac address, and IP address, or any other unique identifier or network address that may be used to identify and/or establish a connection to the conferencing device 216. Similarly, the Bluetooth beacon 220 may periodically broadcast, using Bluetooth protocol a signal encoding a device identifier that identifies the Bluetooth beacon 220.

In this example, the room 204 (and the building 200) is illustrated as having devices that communicate using ultrasound and Bluetooth. However, in other examples, other wireless protocols and/or technologies may be used (e.g., Wi-Fi (IEEE 802.11), GPS, Near-Field Communication (NFC), Zigbee, and the like). Each wireless protocol may have a different detection range (e.g., a maximum distance from the device at which a signal source can be detected) relative to other wireless protocols. For example, Wi-Fi (IEEE 802.11) has a range that is on the order of tens to meters (e.g., 50 meters), Bluetooth may have a range that is on the order of a number of feet (e.g., 2 feet), and NFC may have a range that is on the order of inches (e.g., 1 inch). In some cases, when determining a location (e.g., approximate location, location identifier, and the like) of an endpoint, the detection range of the particular protocol or technology is used to assigning a weight to the location determined from the technology (e.g., assigning higher weights to detection mechanisms having smaller detection ranges relative to other detection mechanisms due to the smaller detection ranges corresponding to more accurate location estimates relative to larger detection ranges). For example, approximate locations determined from NFC or ultrasound may be assigned a higher weight than locations determined using Bluetooth (e.g. based on NFC and ultrasound having a smaller detection range and, therefore, the NFC or ultrasound transmitter may be a better proxy for the location of the device than a Bluetooth beacon).

In one example implementation, each endpoint 112a-k and/or MCSs/MCC 144 includes software (e.g., as part of a connectivity management module) to achieve or to support the connection management functions, as outlined herein in this document. In other embodiments, this feature may be provided externally to any of the aforementioned elements, or included in some other network element to achieve this intended functionality. Alternatively, several elements may include software (or reciprocating software) that can coordinate in order to achieve the operations, as outlined herein. In still other embodiments, any of the devices of the figures may include any suitable algorithms, hardware, software, components, modules, interfaces, or objects that facilitate these endpoint identification operations.

It is imperative to note that FIGS. 1 and 2 are indicative of just one, of the multitude, of example implementations of communication system 100. Any of the modules or elements within endpoints 112a-k and/or MCSs/MCC 144 may readily be replaced, substituted, or eliminated based on particular needs. Furthermore, although described with reference to particular scenarios, where a given module (e.g., virtual meeting clients, connectivity management modules, etc.) is provided within endpoints 112a-k or MCSs/MCC 144, any one or more of these elements can be provided externally, or consolidated and/or combined in any suitable fashion. In certain instances, certain elements may be provided in a single proprietary module, device, unit, etc. in order to achieve the teachings of the present disclosure. For example, while the implementation illustrated in FIG. 2 shows each of the location service 214, the location manger 213, and the location connector 212 being a separate component, the teachings of the present disclosure are not limited to such an implementation. In other implantations, such components can be included within a single component and/or a single device (whether physical or virtualized). For example, a single server (e.g. located in the data center meeting zone 140) may include each of the location service 214, the location manger 213, and the location connector 212. Thus, the single server would perform operations as described above with reference to each of the location service 214, the location manger 213, and the location connector 212.

Figure 3:
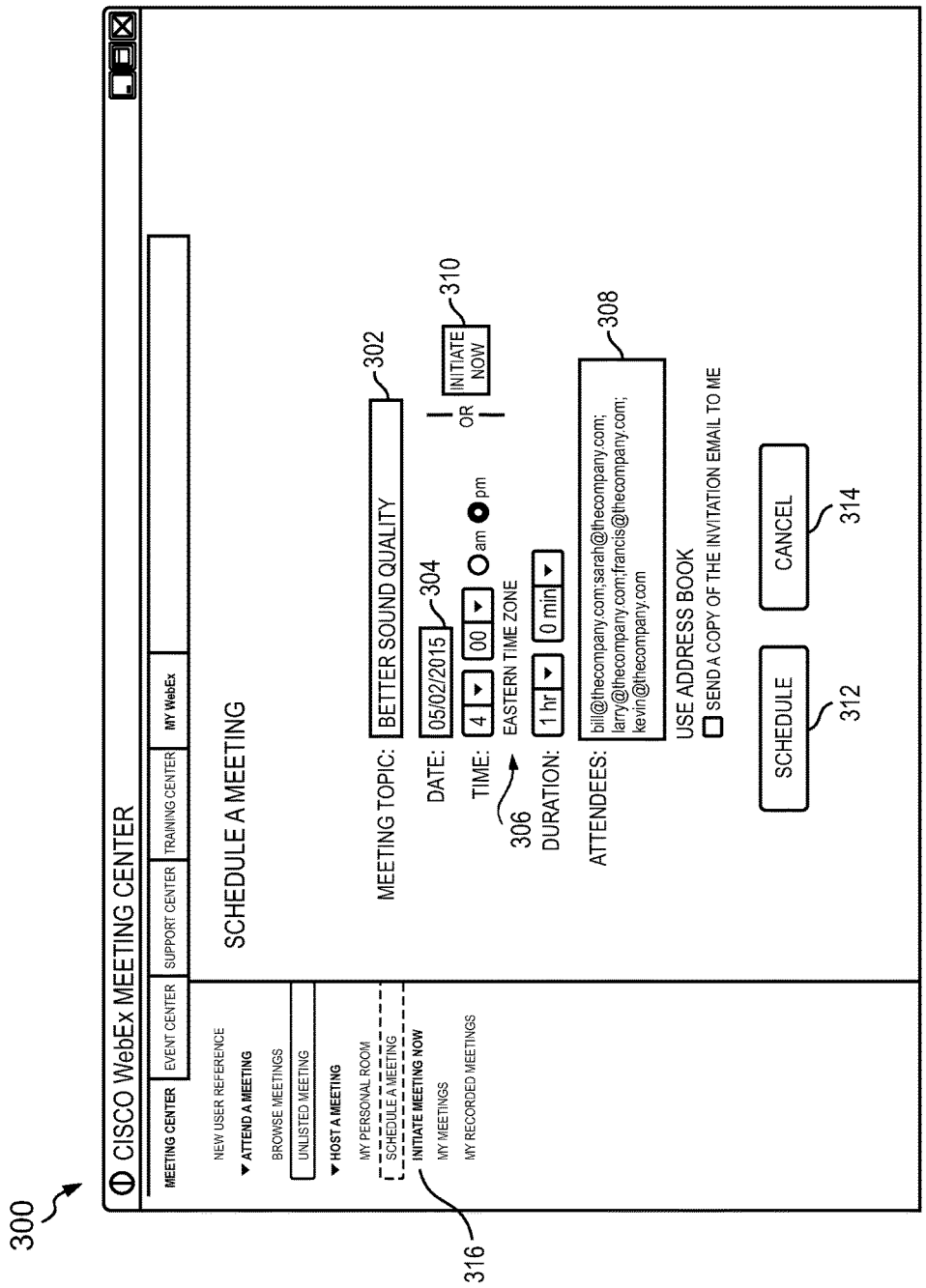
FIG. 3 is a simplified illustration of a user interface for requesting to initiate a virtual meeting session involving multiple endpoints in accordance with some embodiments of the present disclosure.
Figure 4:
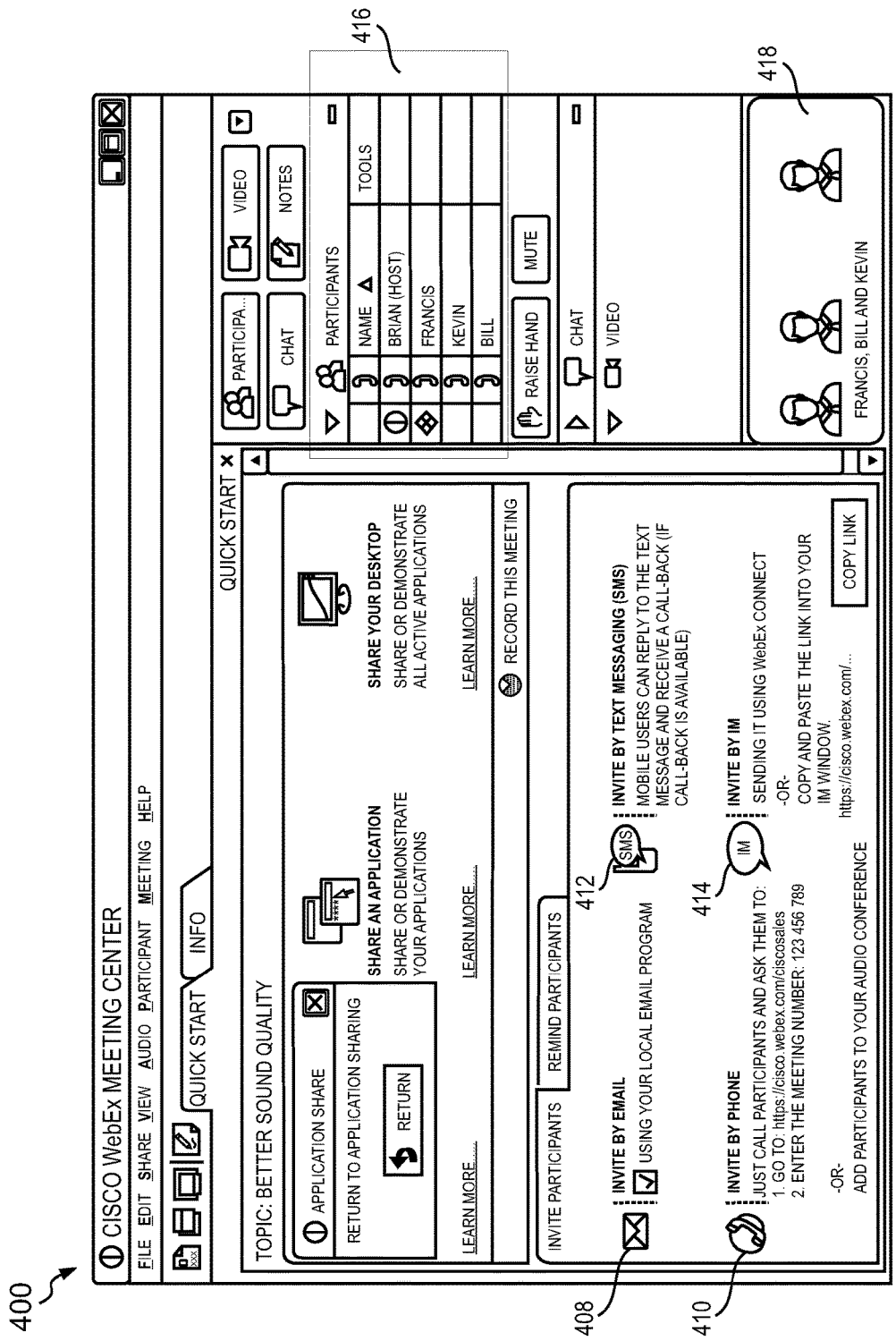
FIG. 4 is a simplified illustration of a user interface for a virtual meeting session, in accordance with some embodiments of the present disclosure.
Figure 5:
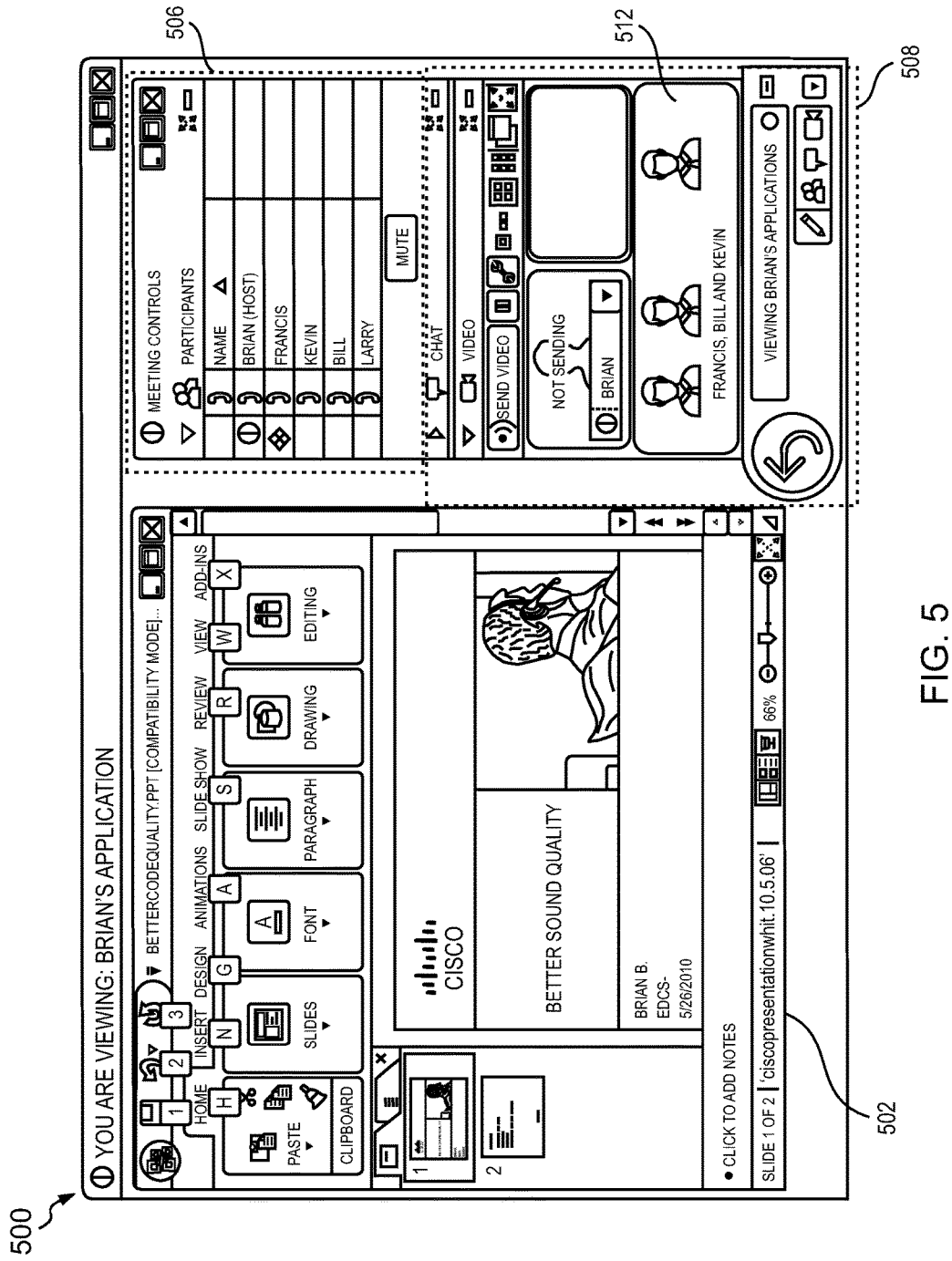
FIG. 5 is a simplified illustration of another user interface for the virtual meeting session of FIG. 4, in accordance with some embodiments of the present disclosure.

In operation, any of the endpoints 112a-k may transmit a request to the virtual meeting management server 144 to initiate a virtual meeting. In this example, the endpoint 112c (associated with the user Brian via Brian's user profile) generates a request to initiate a virtual meeting session. FIGS. 3, 4, and 5 are simplified schematic diagrams illustrating example user interface graphics associated with managing connections for a virtual meeting. The FIGS. 3, 4, and 5 will be described in the context of FIG. 2 and the virtual meeting initiated by the user Brian via the endpoint 112c. The endpoint 112c executes a virtual meeting client, which generates the user interface 300 of FIG. 3 on a display of the endpoint 112c.

Turning to FIG. 3, FIG. 3 is a simplified illustration of a user interface for requesting to initiate a virtual meeting session involving multiple endpoints. The user interface 300 includes several graphical components for receiving data utilized to generate a request for virtual meeting session. In this example, the user interface 300 includes text boxes 302 and 308, date picker 304, time and duration picker 306, buttons 310, 312, and 314, and link 316 (referred to collectively as the graphical components). The text box 302 is to receive text identifying a descriptive topic of the virtual meeting. The date picker 304 is operable to receive a selection of a start date of the virtual meeting. The time and duration picker 306 is operable to receive a selection of a start time and a duration of the virtual meeting. The text box 308 is to receive user identifiers (in this case, text of email addresses) identifying users to be included in the virtual meeting session. A user identifier is inclusive of an identifier that uniquely identifies a particular user and, in some cases, is an identifier through which to contact the user. For example, the user identifier may be a name, an email address, phone number, a hyperlink (e.g. to a user profile for the user), or any other identifier. The button 310 is operable to immediately initiate a meeting (at the current time and disregard the date and time info of 304 and 306). The button 312 is operable to receive a selection to schedule the meeting. When the button 312 is selected, the virtual meeting session is initiated at the date and time specified in 304 and 306; the virtual meeting session may be terminated at the after the duration of time has expired (relative to the date and time specified in 304 and 306). The button 314 is operable to receive a selection to not schedule a meeting (e.g., and discard the data input into the interface 300).

The endpoint 112c is used to generate input for supplying to the graphical components of interface 300. In this case, the endpoint 112c has input text "Better Sound Quality" in the text box 302, set the date to May 2, 2015 via the date picker 304, and input email addresses (i.e., user identifiers) for each of the users Bill, Sarah, Larry, Francis, and Kevin to be invite to the meeting. Note that although the text box 308 does not explicitly include a user identifier corresponding to the user Brian, the user Brian is implicitly included in the user identifiers based on the user Brian's profile having been used to create the virtual meeting request. In this example, Brian used a virtual meeting client on his endpoint 112c through which he is logged into the virtual meeting client using his user profile. Since a client associated with Brian's user profile generated the virtual meeting session request, Brian's user identifier is included in the list of those to be involved in the virtual meeting session. The virtual meeting to be scheduled by the endpoint receiving a selection of the button 312 (e.g., scheduled for initiation at the date and time specified in the interface 300). Likewise, the virtual meeting may be in immediately initiated by selecting button 312. In either case, the user interface 300 generates a request for virtual meeting session and transmits, via the virtual meeting application, the request to a meeting management server (e.g., 144 of FIG. 1 or 2). The meeting management server receives, from the endpoint 112c, the request to initiate the virtual meeting session. In this example, endpoint 112c receives a selection of the button 310 to immediately initiate a virtual meeting session involving the users identified in the text box 308 and the user Brian.

Regardless of whether the meeting was previously scheduled or was selected for immediate initiation, the user identifiers (e.g., email addresses in the example of FIG. 3 and the user Brian) corresponding to each of the users must be contacted to alert them of the begin of the meeting session. Turning back to FIG. 2, some traditional systems may alert each of the endpoints 112f, 112g, 112h, 112i, 112j, 112k, 112a, and 112b. In such traditional systems, all of the endpoints associated with the virtual meeting session are notified, by the meeting management server, of the start of the meeting via the virtual meeting client. For example, each of the endpoints may simultaneously ring, vibrate, generate pop-up windows, or otherwise generate alerts. When each of the endpoints 112f, 112g, 112h, and 112i is located in the same room 204 such simultaneous notifications at the start of a meeting can degrade the user experience for the users Francis, Bill, and/or Kevin. For example, each co-located endpoint being notified of to the start of the meeting can confuse and distract the users from deciding whether to and how to join the virtual meeting. The meeting management server may consume significant computational resources to generate and transmit such notifications to each of the individual endpoints. Moreover, if each of the endpoints chooses to join the virtual meeting, the meeting management server will individually connect each of the endpoints to the virtual meeting session. Such multiple connections further exacerbate the problem of large computational demand on the meeting management server. An objective technical problem in this context is to reduce the computational demand on the virtual meeting server for virtual meetings that involve multiple endpoints.

The methods, systems, logic, and/or apparatuses (as disclosed herein) address the above technical problem (and others) by reducing the number of connections established by the meeting management server for the virtual meeting session. For example, upon receiving a request to initiate a virtual meeting session involving multiple endpoints, a location for each of the endpoints can be determined (e.g., by a connectivity management module) to identify whether any of the endpoints are proximate to the same location (i.e., whether they are co-located). Moreover, the location is determined for all devices associated with all users involved in the virtual meeting (and not only for devices associated with a single user). When it is determined (e.g., by the connectivity management module) that two or more the devices are co-located, a single connection is established to the virtual meeting session on behalf of the co-located endpoints. Consequently, utilizing a nearby conferencing device or only one of the collocated endpoints reduces the number of connections required to connect all of the meeting participants to the meeting. In addition, the user experience is improved by reducing the number of simultaneous alerts sent to co-located endpoints. Once a connection has been established with a conferencing device or one of the co-located devices, the others of the co-located devices are prevented from connecting to the virtual meeting session.

As described above with respect to FIG. 3, the endpoint 112c receives a selection of the button 310 to request, from the virtual meeting management server 144, initialization of a virtual meeting session involving the users identified in the text box 308 (FIG. 3) and the user Brian. Upon receiving the request, the virtual meeting management server 144 initiates the virtual meeting session and requests location information for each of the endpoints associated with the virtual meeting (i.e., after the meeting is initiated by the user Brian's endpoint 112c using interface 300). For example, the meeting management server may retrieve email addresses from the request to initiate the meeting session (i.e., generated using the interface 300) and from a user profile from which the virtual meeting is requested. Using the email addresses, the meeting management server may identify endpoints that are associated with each of the users and may poll the location service 214 for current locations of those endpoints. In this example, because the location manager 213 is constantly polling the network-connected devices in the building, current information for each of the endpoints within building 200 may be available. Moreover, each endpoint and/or access point periodically transmits updated location information to the location service 214. Thus, a location identifier (e.g., building identifier, room identifier, coordinate, and the like) for each of the endpoints can be determined (e.g., by a connectivity management module in the server) based on location data (e.g., ID of Bluetooth beacon, ID of Wi-Fi access point ID, ID of conferencing device, ID of the endpoint) received from one or more wireless communication devices on each of the endpoints or received from access points. For example, the Bluetooth beacon 220 transmits its own device identifiers using Bluetooth protocol. In the example of FIG. 2, Bluetooth transceivers on each of endpoints 112j, 112k, 112f, 112g, 112h, and 112i has detected the device identifier of the Bluetooth beacon 220 (e.g., Bluetooth discovery signals from the). Each of the endpoints 112j, 112k, 112f, 112g, 112h, and 112i transmits the device identifier to the location manager 213. In addition, each of the endpoints 112f, 112g, 112h, and 112i has decoded a device identifier from an ultrasound signal from ultrasound transmitter 218 the conferencing device 216 (i.e., received using a ultrasound receiver in each the endpoints). In this case, the location data is a device identifier sensed by the wireless communication devices on the endpoint. Each of the endpoints 112f, 112g, 112h, and 112i transmits the device identifier to the location manager 213. The endpoints 112a and 112c transmit location data the location service 214 via a virtual meeting client or other location clients on the endpoint. In this example, the device identifier is an IP address for the conferencing device 216. However, the device identifier may be any identifier (e.g., phone number, network address, MAC address, and the like) that can be used to establish a connection to device for receipt and transmission of a communication data streams associated with the virtual meeting session. As discussed before, any location data collected by the location manager 213 or the endpoints is aggregated and synthesized by the location service 214 to provide location identifiers for endpoints and/or user profiles. Thus, the location service 214 receives at least a portion of the location data from the wireless communication devices on each of the endpoints. The meeting management server 144 (and/or a connectivity management module within the server) can retrieve a location identifier for each of the plurality of endpoints based on the location data generated by the endpoints.

A 'location identifier' is inclusive information identifying a distinct location (e.g., a point or a region). For example, a location identifier may be, e.g., a building identifier, room identifier, a room identifier, a coordinate, a GPS position coordinate, and the like. In some examples, the location identifier is descriptive (e.g., a descriptive name of a location such as "Room 5" or "foyer"). In other examples, the location identifier is a numerical representation of a location (e.g., "235"). In further examples, the location identifier may be encoded using a combination of descriptors (e.g., a location identifier for building 5, room 255 may be 5-255). In the example of coordinates, the coordinates may be a latitude, longitude, and/or elevation. Regardless of the type of data format used for the location identifier, different location identifiers are must be in the same format for comparison. The location service 214 can translate one data format to another data format to enable comparing data gathered from multiple sources. The location service 214 may access a mapping of device identifiers to location identifiers. In effect, the mapping provides locations for each of the devices identified by the identifiers. In addition to this mapping, the location service 214 may include, for each of the location identifiers, various formats of location data. For example, for a single location identifier, location data may be stored in a textual format, as one or more coordinates, a region, or in other data formats. This allows the location service 214 to translate from, for example, textual descriptions to coordinates (or vice versa). This allows a GPS coordinate to be compared to a textual description of a room (e.g., based on corresponding coordinates for the textual description of the room).

After the location identifiers are determined for each of the endpoints associated with the virtual meeting, the location identifiers are compared (by a connection management module) to determine whether any of the endpoints are co-located. In the example of FIG. 2, each of endpoints 112f, 112g, 112h, and 112i has decoded a device identifier identifying the conferencing device 216 (from the ultrasound transmitter 218) and detected a device identifier identifying the Bluetooth beacon 220. For each of these devices, the device identifier of the conferencing device 216 was detected using an ultrasound receiver, which is more accurate than the Bluetooth beacon 200. Thus, the location identifier of each of these endpoints is determined from the ultrasound data and not the Bluetooth data based on the based on the ultrasound detection range being smaller than the Bluetooth detection range. A location identifier is retrieved for each of the endpoints from a mapping of device identifiers to location identifiers (e.g. stored in the meeting management server 144). Thus, the location identifier of each of these endpoints is determined to be the location identifier corresponding to the room 204 in which the conferencing device 216 is located (e.g., a coordinate plus or minus the detection range of an ultrasound receiver, a textual description of the room 204, and the like). The endpoints 112j and 112k detected only the Bluetooth beacon 220. Thus, the location of each of these endpoints is approximated as the location identifier corresponding to the room 204 in which the Bluetooth beacon is located. The location of each of the endpoints 112a and 112c is identified based on the approximate coordinates of wireless access points to which they are connected (each of which is located remote from the other). In this example, it is determined that two or more of the endpoints are co-located at a same location based on the location identifiers. In particular, each of the endpoints 112f, 112g, 112h, and 112i, 112j, and 112k has a location identifier corresponding to the room 204. The accuracy of the wireless communication devices used to detect the location of the endpoints 112f, 112g, 112h, and 112i is higher than a threshold value (e.g., the weight assigned to ultrasound detection is equal to or above a threshold set for the meeting management server). However, although each of the endpoints 112j and 112k have the location identifier corresponding to the room 204, the accuracy of the wireless communication devices used to detect the location of these endpoints is lower than the threshold value (e.g., the weight assigned to Bluetooth detection is below the threshold set on the meeting management server).

When it is determined (e.g., by a connectivity management module) that two or more of the endpoints are co-located at a location based on the location identifier, a connection to the meeting management server is automatically established on behalf of the two or more of the endpoints. Because the accuracy of ultrasound detection is above the threshold value (as described above), a connection is automatically (e.g. without any further input from the endpoints) established to the virtual meeting session on behalf of the endpoints 112f, 112g, 112h, and 112i. In this example, the meeting manager server 144 automatically establishes a connection with the conferencing device 216 on behalf of the endpoints 112f, 112g, 112h, and 112i. The meeting manager server 144 transmits, over the connection, to the conferencing device 216 an audio steam and a video stream associated with the virtual meeting session. In addition, each of the endpoints 112f, 112g, 112h, and 112i (i.e., two or more of the endpoints) may be prevented from establishing direct connections to the virtual meeting server (e.g., based on the establishment of the connection between the meeting management server and the conferencing device 216). Instead of establishing four connections to the virtual meeting (e.g. one for each of the endpoints 112f, 112g, 112h, and 112i), only one connection is established to the conferencing device 216. In this example establishment of the connection to the conferencing device 216 (instead of the individual endpoints) reduces the number of connections established by the meeting management server for the virtual meeting session at least by three connections. In some examples, the meeting manager server 144 transmits a request to the conferencing device 216 to confirm a list of the endpoints (and/or users) on behalf of which the connection is established. For example, the meeting manager server 144 may transmit to the conferencing device 216 a list of co-located users and request confirmation that each of the co-located users is present at the location. When it is determined that the endpoints 112a and 112c are not located with other endpoints, individual connections are established to each of these endpoints for the virtual meeting session.

In some examples, the user profiles associated with each of the co-located endpoints (in this case, endpoints 112f, 112g, 112h, and 112i) are added to a list of participants present in the meeting based on the establishment of the connection with the conferencing device 216. In fact, each of the users associated with the co-located endpoints is marked as being present in the meeting based on the detection that their corresponding endpoints are near the conferencing device 216. Turning to FIG. 4, FIG. 4 is a simplified illustration of a user interface for a virtual meeting session. This particular example relates to a virtual meeting session initiation, specifically as the virtual meeting session begins (e.g., video stream as displayed on the endpoint initiated the virtual meeting). In this example, the interface 400 corresponds to that illustrated on the endpoint 112c (the host's endpoint), which associated with the user Brian. Interface 400 includes interface components 408, 410, 412, and 414, each of which is operable to invite additional participants to the virtual meeting through a different method (i.e., email, phone, text, and instant message, respectively). The graphical component 416 renders a list of participants present in the virtual meeting session. In this example, the list of participants identifies a user identifier (in this case a name) associated with each of the co-located endpoints (via a user profile). Although each of the co-located endpoints is not directly connected to the virtual meeting server, the user identifiers associated with each of the co-located endpoints are identified, in the list of participants, as being connected to in the virtual meeting (i.e., based on the connection to the virtual meeting session using the conferencing device 216). In addition, a video data stream is rendered in graphical component 418. In this example, the conferencing device 216 comprises a video camera that streams video of the interior of the room 204 (where the users Francis, Kevin, and Bill are located). Thus, the video stream in 418 illustrates live images of Francis, Kevin, and Bill. In addition, the video stream is overlaid with the user identifier corresponding to each of the co-located endpoints.

A meeting may have one or more designated presenters who share content in the meeting. In this case, there is only one presenter, Brian, who is also the meeting host. However, in other cases, the presenter is not the host and, instead, is a different participant in the meeting. Brian is sharing a slide show application including a presentation titled "Better Sound Quality" with other participants in the virtual meeting (as illustrated in presentation data 302). During the virtual meeting, the endpoint 112c (associated with the meeting host, Brian) is sharing a PowerPoint presentation. Brian can freely share his desktop such that others meeting participants can observe information that is resident on his local machine. While FIG. 4 illustrates the video data rendered on the endpoint 112c, FIG. 5 illustrates the video data rendered on the conferencing device 216 after the co-located participants have joined the meeting on the conferencing device. In the example illustrate in FIG. 4, the user Larry had not yet joined the virtual meting. However, prior to a time at which the interface 500 is generated (FIG. 5 as discussed below), the user Larry uses endpoint 112a to establish a connection to the virtual meeting session and, thereby, joins the meeting.

FIG. 5 is a simplified illustration of another user interface 500 for the virtual meeting session of FIG. 4. In particular, the user interface 500 illustrates the meeting information as displayed on the conferencing device 216, which is connected to the virtual meeting session on behalf of several co-located endpoints (i.e., endpoints 112f, 112g, 112h, and 112i associated with users Francis, Bill, and Kevin). In this example, the co-located users (i.e., Francis, Bill, and Kevin) have just joined the meeting using a single conferencing device 216 (instead of their respective endpoints). The co-located users can observe information that is resident on endpoint 112c (or resident on another endpoint that becomes the active presenter in the meeting) via the user interface 500. The user interface 500 illustrates, at least in part, a communications data stream as generated for display in the virtual meeting client on the conferencing device 216. The communications data stream includes any visual and/or audio data transmitted to (and received by) devices that are logged into a virtual meeting session. In this example, the communications data stream comprises presentation data 502 (e.g., a video stream), a list of participants involved in the virtual meeting 506, and another video stream 512 (from one or more cameras on the conferencing device 216). The list of participants with active connections to the virtual meeting session is illustrated in user interface (UI) component 506. In this example, the list of participants in the meeting is Brian, Francis, Kevin, Bill, and Larry. The video stream 512 provides the co-located users with a view of themselves in the virtual meeting session. The endpoint 112c (associated with the user Brian) is not streaming video from a camera on the endpoint 112c to the conferencing device 216 (as generally indicated by the text "NOT SENDING" overlain on an avatar for Brian in 508 of FIG. 5). Instead, the endpoint 112c is only streaming video data associated with moving images of a slide show application. Brian is sharing a video stream of his endpoints view of the slide show application including a presentation titled "Better Sound Quality" with other participants in the virtual meeting (as illustrated in presentation data 502). In other examples, presentation data 502 may a video stream of his endpoint's view of other types of documents (e.g., word processor, images, etc.), a desktop, or any other presentation content that is shared by a meeting participant. The presentation data is streamed to the participants that are logged into the virtual meeting session.

Figure 6:
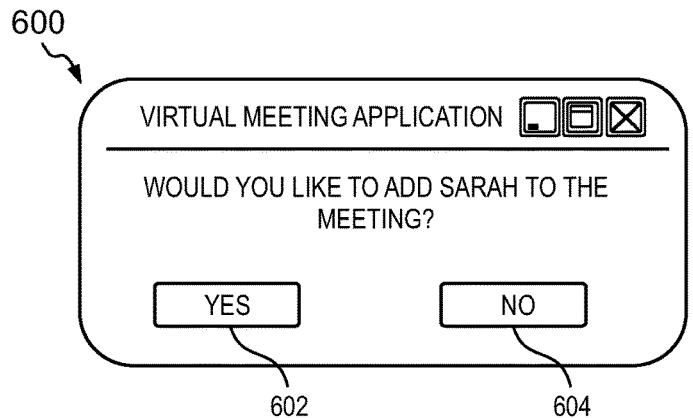
FIG. 6 is a simplified illustration of a window for receiving input for adding a user to the virtual meeting session of FIGS. 4 and 5.

As previously discussed, each of the endpoints 112j and 112k has a location identifier that matches that of the co-located endpoints (i.e., a location identifier corresponding to the room 204 of FIG. 2). The accuracy of the wireless communication devices (in this case, Bluetooth receivers) used to detect the location of the endpoints 112j and 112k is lower than a threshold value. Thus, the user associated with endpoints 112j and 112k is not included in the list of participants on behalf of which the connection was automatically established. Instead, when the accuracy of a location identity of a nearby endpoint is below the threshold value, additional information is requested to determine whether the nearby endpoint should be included in a single connection with the other (potentially) co-located users. For example, the meeting management server 144 may transmit a request for additional information to the conferencing device 216, which is connected to the virtual meeting on behalf of the co-located endpoints. The request may identify a user associated with the nearby endpoint for which the additional information is requested. FIG. 6 illustrates an exemplary window 600 identifying a user associated with a nearby endpoint whose location accuracy was below the threshold value. The conferencing device 216 may generate window 600 based on the request for additional information from the meeting management server 144. The window 600 includes the text "Would you like to add Sarah to the meeting?" The text identifies the user Sarah who is associated with the nearby endpoints 112j and 112k for which the additional information is requested. Because the detection mechanism used to determine the location identifier for each of the endpoints 112j and 112k is assigned a weight below the threshold value, Sarah is not automatically connection to the virtual meeting session. Instead, the window 600 prompts the conferencing device 216 for addition information to confirm or deny the addition of Sarah as a co-located user. The window includes the buttons 602 and 604 (including the text "YES" and "NO", respectively) for confirming or denying the addition of Sarah as a co-located user. When a selection is received at the button 602, the user Sarah is added to the list of participants present in the meeting (and the endpoints 112j and 112k may be prevented from directly establishing a connection to the virtual meeting session). When a selection is received at the button 604, the user Sarah is not added to the list of participants present in the meeting. In such a case (i.e., the selection is received at the button 604), the endpoints 112j and 112k are not prevented from directly connecting to the virtual meeting session and may individually establish connections to the virtual meeting session. Consequently, each of the endpoints 112j and 112k are notified of the start of the virtual meeting (e.g., via a virtual meeting client that is allowed to establish a connection to the virtual meeting).

The above example illustrates an approach to establishing and/or or preventing connections to a virtual meeting session based a determination of whether endpoints are in a same location when the virtual meeting session is initiated. However, because each endpoint may move throughout the duration of the virtual meeting session, the device through which a user is connected to the virtual meeting session may change. An endpoint may continue to periodically transmit updated location data from one or more wireless communication devices on the endpoint throughout the duration of the virtual meeting session. An updated location identifier can be determined based on the updated location data.

An endpoint that was not previously co-located with other endpoints may be later found to be co-located with other endpoints involved in the virtual meeting session. Upon detecting that the endpoint is co-located (e.g., at a location) based on an updated location identifier, a connection between the endpoint and the meeting management server may be automatically terminated (e.g., based on the endpoint being co-located at the location with the two or more of the plurality of endpoints). For example, such detection may occur when the previous location identifier may not have matched any other of the endpoints but the updated location identifier matches one or more other endpoints involved in the virtual meeting session. A connection between the endpoint and the meeting management server for the virtual meeting session may be terminated based on the endpoint being co-located with other endpoints that are involved in the meeting session. The connection may be terminated automatically (e.g., without the endpoint receiving any user input explicitly requesting such a termination). A new connection may be established on behalf of the newly co-located endpoints (if one does not already exist). If one already exists, then there is no need to add another ant the user is able to participate in the meeting using the existing connection. In addition, the user associated with the endpoint may be remaining in the list of participants involved in the meting despite having the direct connection to the endpoint terminated (again based on the endpoint being co-located with other endpoints that are involved in the meeting session).

Alternatively, an endpoint that was previously co-located with other endpoints may be later found to be no longer co-located with other endpoints involved in the virtual meeting session. Upon detecting that the endpoint is no longer co-located (e.g., at a location) based on the updated location identifier, a request to establish a connection between the endpoint and the meeting management server may be transmitted to the endpoint. For example, such detection may occur when the previous location identifier matched that of one or more others of the endpoints but the updated location identifier does not match any of the others of the endpoints involved in the virtual meeting session. A connection between the endpoint and the meeting management server for the virtual meeting session may be established based on the endpoint no longer being co-located with other endpoints that are involved in the meeting session. The connection may be established automatically (e.g., without the endpoint receiving any user input explicitly requesting such a connection). In addition, the user associated with the endpoint may be remaining in the list of participants involved in the meting despite having left the location where the other endpoints are co-located (and corresponding user are located) (based on the new direct connection to the endpoint). The connection enables the endpoint to receive, e.g., an audio steam and/or a video stream associated with the virtual meeting session.

Figure 7:
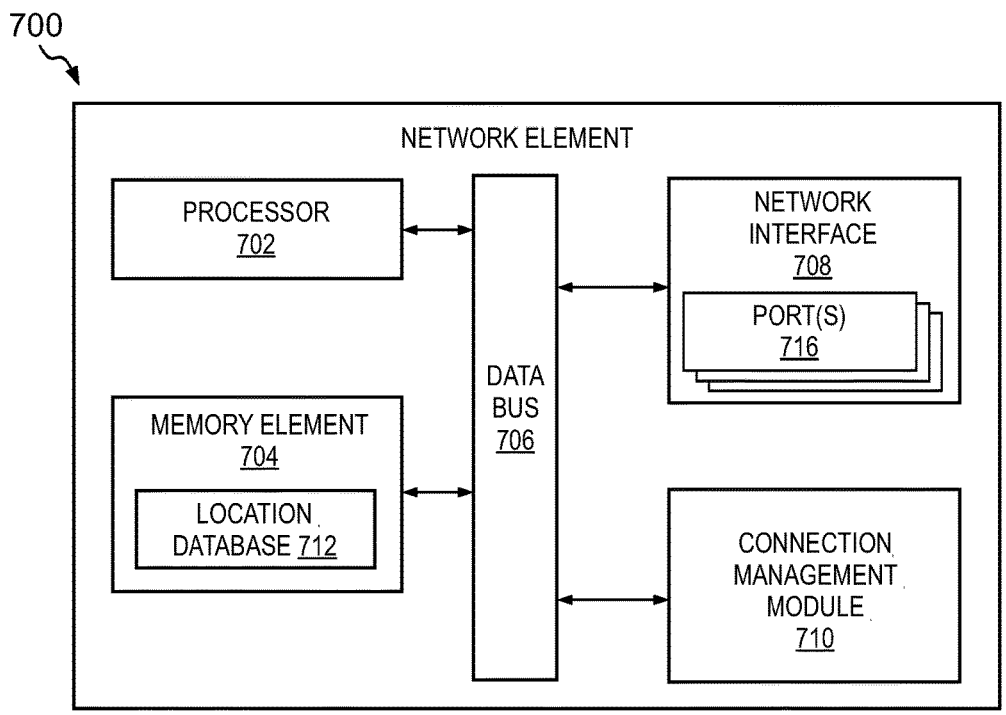
FIG. 7 is a simplified schematic diagram illustrating an exemplary network element.

FIG. 7 is a simplified schematic diagram illustrating an exemplary network element (i.e., network element 700). As used herein, the term 'network element' is meant to encompass any type of servers (e.g., a video server, a web server, meeting conference server, etc.), routers, switches, gateways, bridges, load balancers, access points, Bluetooth beacons, firewalls, inline service nodes, proxies, network appliances, processors, modules, or any other suitable device, component, element, or object operable to exchange information in a network environment. This network element may include any suitable hardware, software, components, modules, interfaces, or objects that facilitate the operations thereof. This may be inclusive of appropriate algorithms and communication protocols that allow for the effective exchange (reception and/or transmission) of data or information.

The network element 700 is an example of the any of the network elements in the communication system 100 (of FIGS. 1 and 2). The network element 700 comprises a processor 702, a memory element 704, a data bus 706, a network interface 708, and a connection management module 710 (collectively referred to as the components of the network element). The data bus 706 operably couples the components to one another. The network interface 708 includes a plurality of ports 716, each of which is configured to transmit and/or receive data over a network. The memory element 704 stores, among other things, location database 712 and a virtual meeting code block. The location database 712 is inclusive of a database of location data for conferencing devices and/or network elements, which may be used to determine a location (location identifier) for an endpoint.

The processor 702, among other things, executes the virtual meeting code block, which, at least in part, controls initiation of virtual meeting sessions. The virtual meeting code block includes instructions for establishing and or destroying virtual meeting sessions (e.g., in the communication network 100). The virtual meeting code block includes also includes instructions for initiation a connection to the virtual meeting session for an endpoint or conferencing device.

The connection management module 710 includes instructions for managing connections to virtual meeting sessions. When executed, such instruction can improve the functioning of a network element 700. For example, when the processor 702 executes the virtual meeting code block to initiate a virtual meeting session, the virtual meeting code block may pass control of connection management to the connection management module 710. The connection management module 710 can control, e.g., whether to and when to create connections to the virtual meeting session for endpoints and conferencing devices (e.g., based on locations of the endpoints invited to the virtual meeting). Such control can result in reducing the number of connections established for a virtual meeting session (e.g., relative to individually connecting to each user's endpoint) and, thereby, reduces the computation load on the network element 700. As a further example, the management module 710 may implement any one or more of logic 1000 (of FIG. 10), logic 1100 (of FIG. 11), and/or logic 1200 (of FIG. 12) in hardware and/or software. For example, when implemented in hardware, the connection management module may be an application specific integrated circuit (ASIC) hardware capable of executing the instructions for managing connections to virtual meeting sessions. This may further improve performance of the network element 700 (e.g., relative to a software implementation) by further offloading the processes from the processor 702 to a specific hardware layout (i.e., the ASIC).

The location database 712 may include a mapping of device identifiers (identifying each conferencing device and/or network element) to location identifiers. The network element 700 may use the database 712 to determine a location of an endpoint. For example, an endpoint can detect (e.g., using wireless communication devices and/or network interfaces) a device identifier from a conferencing device and/or a network element and transmit the device identifier (directly or indirectly) to the network element 700. The network element 700 can use the database 712 to identify, based on the device identifier, a location identifier corresponding to the location of the endpoint. As a further example, a conferencing device and/or a network element may detect a device identifier of an endpoint and transmit the device identifier to the network element 700. In this case, the network element 700 can use the database 712 to determine the location identifier of the conferencing device and/or network element from which the device identifier of the endpoint was received. The location identifier of the conferencing device and/or the network element is used, at least in part, as a proxy for the endpoint since the endpoint was in a detection range of conferencing device and/or the network element.

Figure 8:
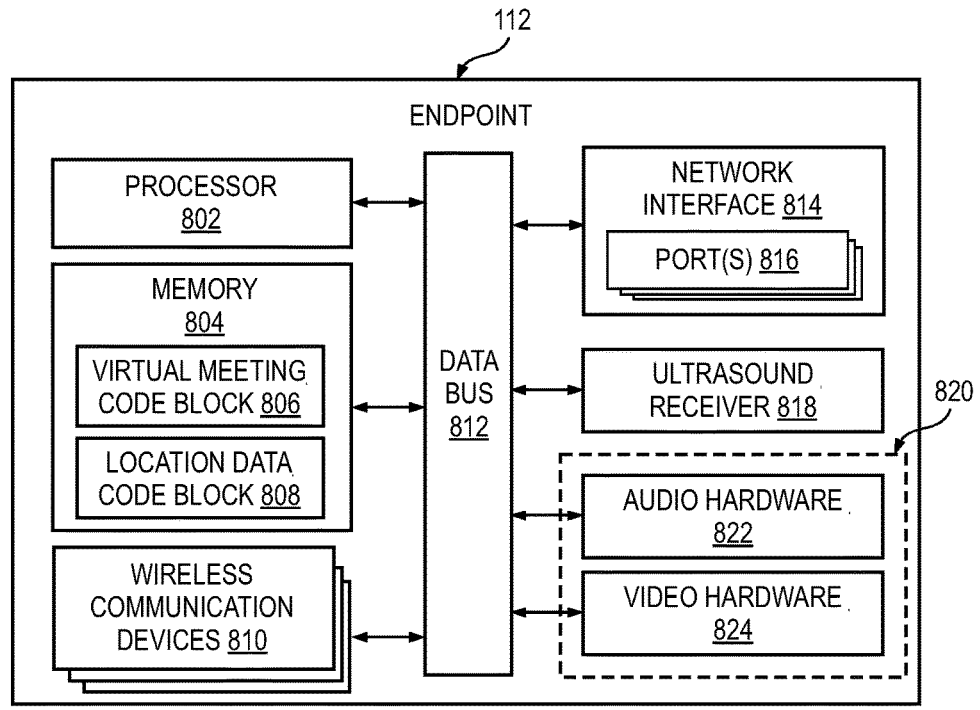
FIG. 8 is a simplified schematic diagram illustrating an exemplary endpoint.

FIG. 8 is a simplified schematic diagram illustrating an exemplary endpoint (i.e., endpoint 112). The endpoint 112 is an example of the any of the endpoints 112a-k in the communication system 100 (of FIGS. 1 and 2). The endpoint 112 comprises a processor 802, a memory element 804, wireless communication devices 810, a data bus 812, a network interface 814, an ultrasound receiver 818, and audio/video (A/V) hardware 820. The data bus 812 operably couples the components to one another. The network interface 814 includes a plurality of ports 816, each of which is configured to transmit and/or receive data over a network. The memory element 804 stores, among other things, virtual meeting code block 806 and location data code block 808. The A/V hardware 820 includes audio hardware 822 and video hardware 824. The audio hardware 822 may include audio input/output devices including, e.g., speakers, microphones, and the like. The video hardware 824 may include video input/output devices including, e.g., display screen and touch screens. The endpoint uses the A/V hardware 820 to receive and render, on the endpoint 112, audio signals (e.g., audio streams on the audio hardware 822) and graphical signals (presentation data, video streams on the video hardware 824) associated with a virtual meeting session (e.g., similar to those as described with respect to FIGS. 3, 4, 5, and 6).

The endpoint 112 can retrieve A/V characteristics (e.g., performance characteristics, video resolution, sound quality metric, and the like) from the audio hardware 822 and the video hardware 824 and may transmit the characteristic to a connection manager module (e.g., for ranking the quality of the A/V hardware 820 relative to that of other endpoints and/or conferencing devices). For example, the A/V characteristics may be compared to A/V characteristics of other endpoints to select an endpoint that is more highly ranked than other endpoints (e.g., to establish a connection to the endpoint that has the best A/V characteristics of those involved in the virtual meeting session).

The processor 802, among other things, executes the virtual meeting code block 806 and the location data code block 808. The virtual meeting code block 806 is inclusive of a virtual meeting client operable (e.g., by the endpoint 112) to request a connection to a virtual meeting session (e.g., from a connection management module 150). The virtual meeting code block can be loaded onto the endpoint (e.g., via one or more webpages or provisioned through any other type of medium such as compact disk (CD), or removable flash memory) before participating in a virtual meeting. When the code block 806 is accessible to the endpoint, any attempt to participate in a virtual meeting results in the processor 802 executing the code block. Executing the code block 806, at least in part, allows the endpoint 112 to establish a connection to the virtual meeting session via with one or more network elements (e.g., provisioned at data center meeting zone 140 and/or data center web zone 130). The location data code block 808 includes instructions for utilizing the wireless communication devices 810 to generate location data. For example, the code block 808 may include instructions for transmitting location data to a location service (e.g., location service 214).

The wireless communication devices 810 are inclusive of hardware for transmitting and/or detecting data wirelessly with another device (e.g., using an wireless communication protocol). Each of the wireless communication devices 810 can generate location data based on movement of the endpoint relative to other devices. For example, any one or more of the wireless communication devices 810 may be a global positioning receiver (e.g., generating location data including coordinates such as latitude, longitude, and/or elevation), a Bluetooth receiver/transmitter (e.g., generating location data including an identifiers of Bluetooth beacon detected by the endpoint), or any other hardware operable to communicate wirelessly with other devices. The ultrasound receiver 818 is a wireless communication device operable to detect and receive signals from an ultrasound transmitter. The ultrasound receiver 818 generates location data, e.g., including a device identifier associated with an ultrasound transmitter detected by the receiver. For example, the ultrasound transmitter may broadcast an ultrasound signal that encodes a device identifier for the ultrasound transmitter (or an device on which it is located). The endpoint 112 may decode the device identifier from the ultrasound signal. The endpoint may transmit the location data to a network element using the network interface 814.

Figure 9:
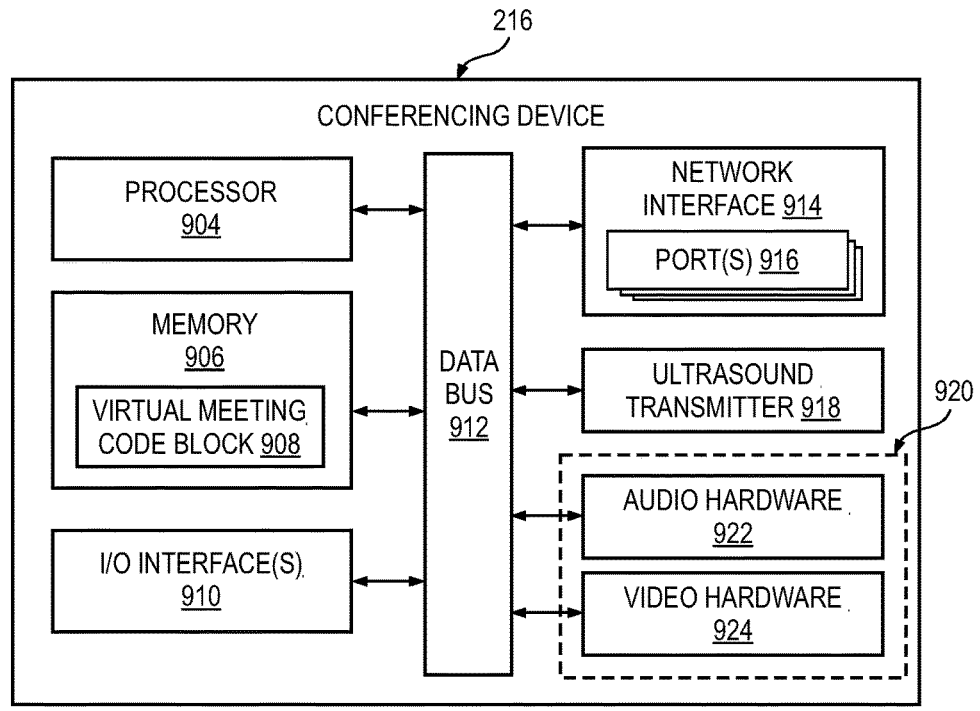
FIG. 9 is a simplified schematic diagram illustrating an exemplary conferencing device.

FIG. 9 is a simplified schematic diagram illustrating an exemplary conferencing device 216. The conferencing device 216 (of FIG. 9) is an example of the conferencing device 216 in the communication system 100 (of FIG. 2). The conferencing device 216 comprises a processor 904, a memory element 906, input/output (I/O) interfaces 910, a data bus 912, a network interface 914, an ultrasound transmitter 918, and audio/video (A/V) hardware 920. The data bus 912 operably couples the components to one another. The network interface 914 includes a plurality of ports 916, each of which is configured to transmit and/or receive data over a network. The memory element 906 stores, among other things, virtual meeting code block 908. The A/V hardware 920 includes audio hardware 922 and video hardware 924. The audio hardware 922 may include audio input/output devices including, e.g., speakers, microphones, and the like. The video hardware 924 may include video input/output devices including, e.g., display screens, touch screens, cameras, and the like. The conferencing device 216 uses the A/V hardware 920 to receive and render, on the conferencing device 216, audio signals (e.g., audio streams on the audio hardware 922) and graphical signals (presentation data, video streams on the video hardware 924) associated with a virtual meeting session (e.g., similar to those as described with respect to FIGS. 3, 4, 5, and 6).

The conferencing device 216 can retrieve A/V characteristics (e.g., performance characteristics, video resolution, sound quality metric, and the like) from the audio hardware 922 and the video hardware 924 and may transmit the characteristic to a connection manager module (e.g., for ranking the quality of the A/V hardware 920 relative to that of other endpoints and/or conferencing devices). For example, the A/V characteristics may be compared to A/V characteristics of other conferencing devices (or endpoints) to select a conferencing device (or endpoint) that is more highly ranked than other conferencing devices (e.g., to establish a connection to the conferencing device that has the best A/V characteristics of those available (nearby) to be used in the virtual meeting session). For example, a subset of the conferencing devices that are within a threshold distance of a current location may be determined from the database (e.g., the database storing a mapping of device identifiers for each conferring device to location identifiers).

The processor 904, among other things, executes the virtual meeting code block 908. The virtual meeting code block 908 is inclusive of a virtual meeting client operable (e.g., by the conferencing device 216) to request a connection to a virtual meeting session (e.g., from a connection management module). The virtual meeting code block 908 can be loaded onto the conferencing device 216 (e.g., via one or more webpages or provisioned through any other type of medium such as compact disk (CD), or removable flash memory) before participating in a virtual meeting. When the code block 908 is accessible to the conferencing device, any attempt to participate in a virtual meeting results in the processor 904 executing the code block 908. Executing the code block 908, at least in part, allows the conferencing device 216 to establish a connection to the virtual meeting session via with one or more network elements (e.g., provisioned at data center meeting zone 140 and/or data center web zone 130). The I/O interfaces 910 are inclusive of hardware for receiving input and/or selections corresponding to user interfaces on the endpoint 216 such as a keyboard, a mouse, or other terminal equipment. The ultrasound transmitter 918 can broadcast an ultrasound signal that encodes a device identifier for the conferencing device 216. An endpoint within range of the signal may detect and receive the ultrasound signal and decode the device identifier therefrom. The endpoint may transmit the location data to a network element.

Figure 10:
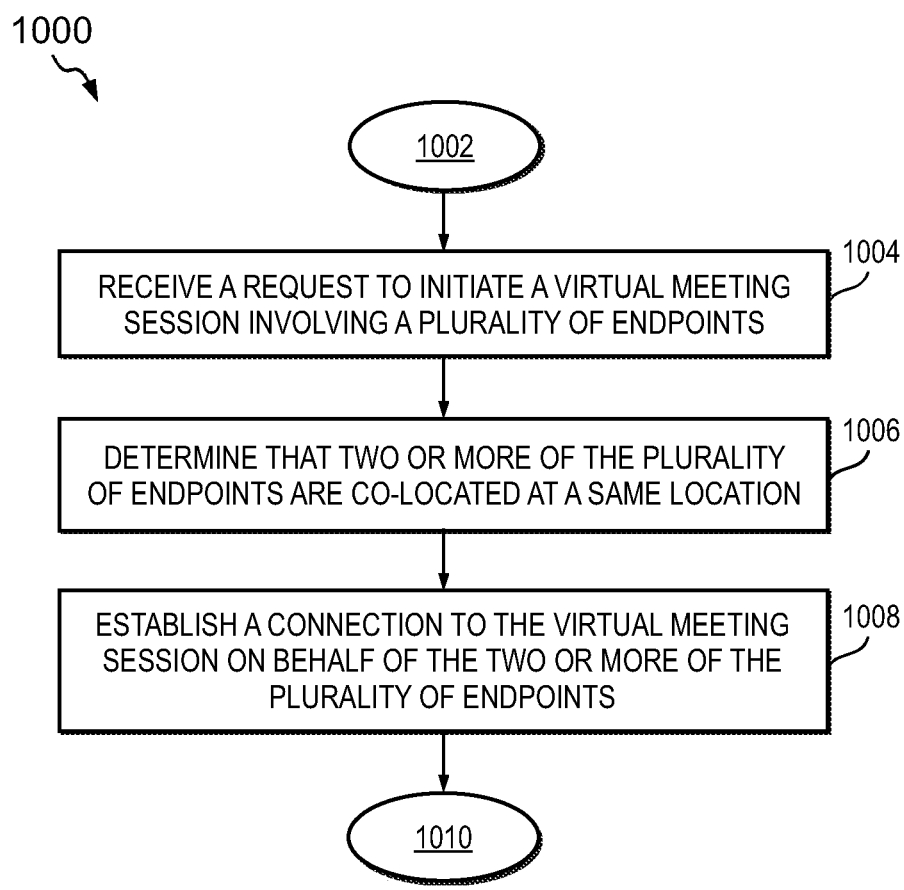
FIGS. 10, 11, and 12 are simplified schematic diagram illustrating exemplary logic for managing virtual meetings, according to some embodiments of the present disclosure.
Figure 11:
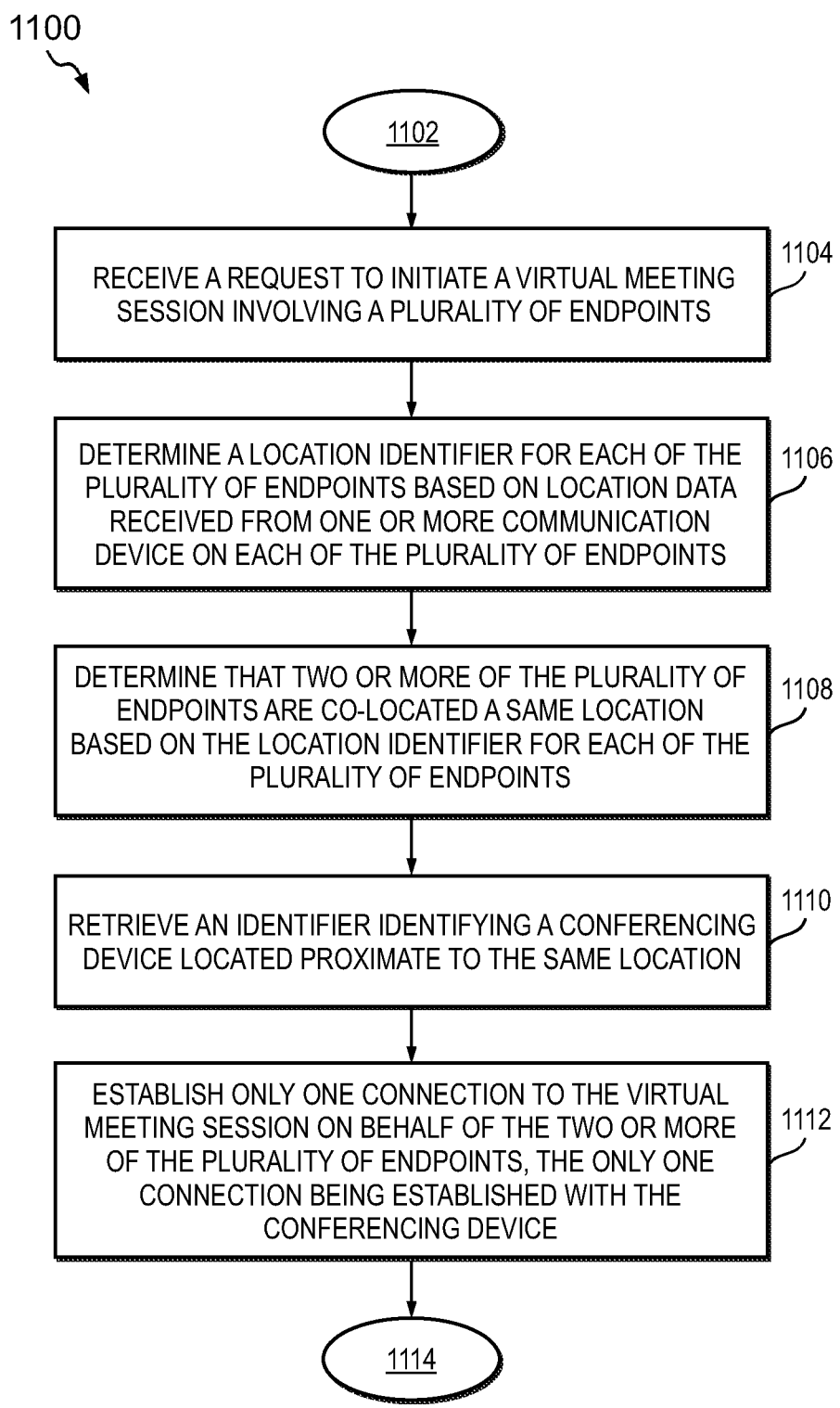
Figure 12:
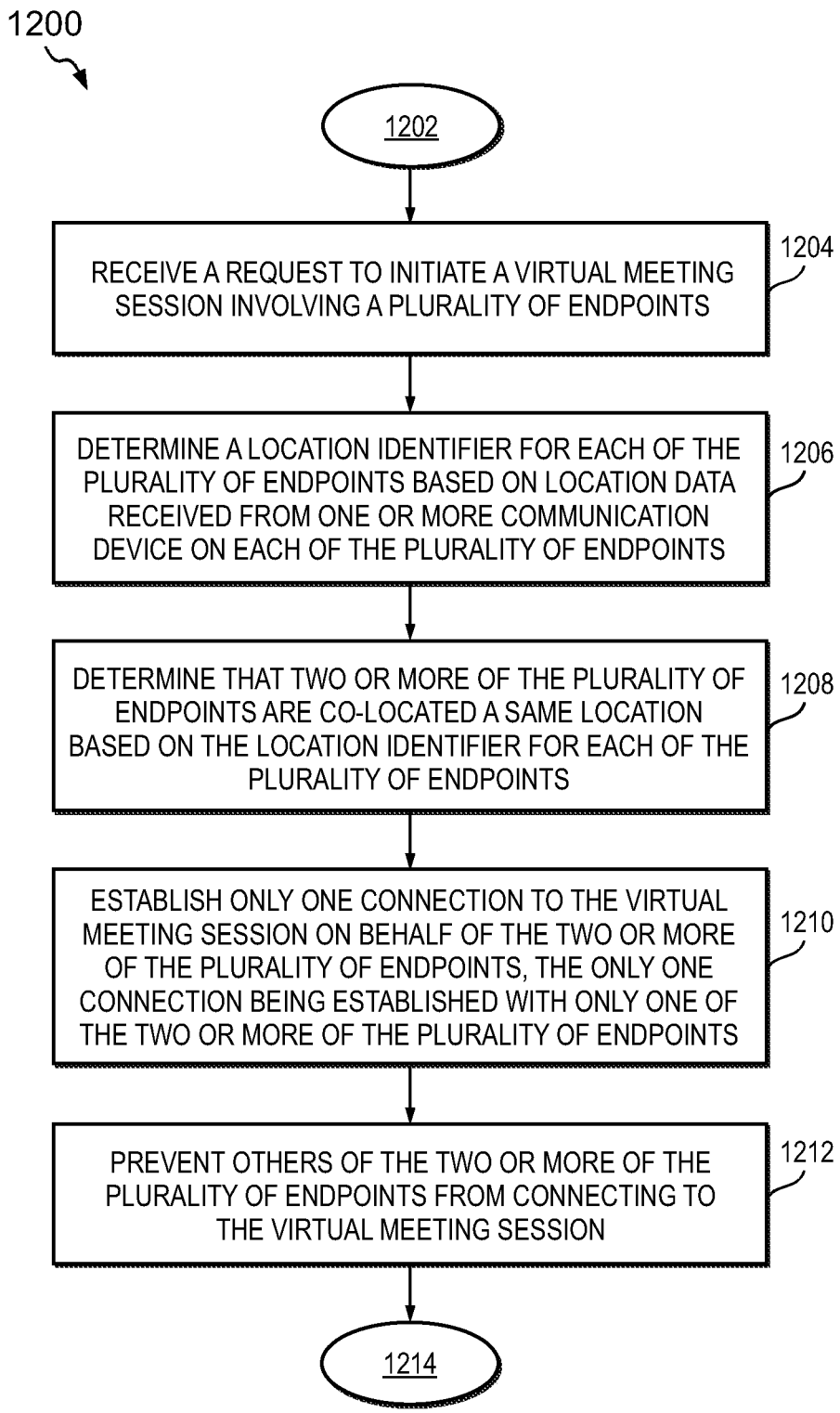

FIGS. 10, 11, and 12 are simplified schematic diagram illustrating exemplary logic for managing virtual meetings, according to some embodiments of the present disclosure.

Turning to FIG. 10, FIG. 10 is a simplified schematic diagram illustrating an exemplary logic (i.e., logic 1000) for reducing a number of connections established by a meeting management server for a virtual meeting session. Procedure 1002 may coincide with a start or end point of other logic, routines, and/or applications. In addition, at 1002, data (e.g., data structures, objects, values, variables, etc.) may be initialized, retrieved, or accessed for use in logic 1000. At 1004, a request is received (e.g., by a connectivity management module) to initiate a virtual meeting session involving a plurality of endpoints. At 1006, it is determined e.g., by the connectivity management module) that two or more of the plurality of endpoints are co-located at a same location. At 1008, a connection is established (e.g., by the connectivity management module) to the virtual meeting session on behalf of the two or more of the plurality of endpoints. The logic 1000 ends at 1010. 1010 may coincide with a start or end point of other logic, routines, and/or applications.

At a high level, the logic 1000 may be used to reduce a number of connections established by a network element for a virtual meeting session. Logic 1000 may be implemented in any network element of FIGS. 1 and 2, and/or network element 700 (of FIG. 7). For example, the processor 702 (in the network element 700 of FIG. 2) may execute logic 1000 (e.g., corresponding to instruction for the connection management module 710) to reduce the number of connections established by the network element 700 for a virtual meeting session. Advantageously, the network element uses the logic 1000 to reduce the number of connections when some of the endpoints involved in the virtual meeting are co-located with one another. The logic 1000 provides a network element with instructions that, when executed, improve the functioning of the network element itself (e.g., by reducing a number of connections generated by the network element for the virtual meeting session).

Turning to FIG. 11, FIG. 11 is a simplified schematic diagram illustrating another exemplary logic (i.e., logic 1100) for reducing a number of connections established by a meeting management server for a virtual meeting session. Procedure 1102 may coincide with a start or end point of other logic, routines, and/or applications. In addition, at 1102, data (e.g., data structures, objects, values, variables, etc.) may be initialized, retrieved, or accessed for use in logic 1100. At 1104, a request is received to initiate a virtual meeting session involving a plurality of endpoints. At 1106, a location identifier is determined for each of the plurality of endpoints based on location data received from one or more communication devices on each of the plurality of endpoints. At 1108 it is determined that two or more of the plurality of endpoints are co-located at a same location based on the location identifier for each of the plurality of endpoints. At 1110, an identifier identifying a conferencing device located proximate to the same location is retrieved. At 1112, only one connection is established to the virtual meeting session on behalf of the two or more of the plurality of endpoints. The only one connection is established with the conferencing device. Users associated with the two or more of the plurality of endpoints may be included in a list of participants that are present in the virtual meeting based on the establishment of the only one connection with the conferencing device. The logic 1100 ends at 1114. 1114 may coincide with a start or end point of other logic, routines, and/or applications.

The logic 1100 of FIG. 11 is an example of the logic 1000 of FIG. 10. For example, 1004 of the logic 1000 corresponds to 1104 of the logic 1100; 1006 of the logic 1000 corresponds to 1106 and 1108 of the logic 1100; and 1008 of the logic 1000 corresponds to 1110 and 1112 of the logic 1100.

In the example as described with respect to FIGS. 2, 3, and 4. A single connection is established to connect a conferencing device (i.e., conferencing device 216) to the virtual meeting session instead of multiple connections (i.e., a connection for each of the plurality of co-located endpoints). However, the present disclosure is not limited to such an example. In other examples, the single connection is established to connect only one of the plurality of co-located devices to the virtual meeting session instead of multiple connections to connect each of the co-located devices to the virtual meeting session. For example, FIG. 12 illustrates exemplary logic for reducing a number of connections by connecting only one of the plurality of co-located devices to the virtual meeting session (on behalf of all of the co-located users).

Turning to FIG. 12, FIG. 12 is a simplified schematic diagram illustrating yet another exemplary logic (i.e., logic 1200) for reducing a number of connections established by a meeting management server for a virtual meeting session. Procedure 1202 may coincide with a start or end point of other logic, routines, and/or applications. In addition, at 1202, data (e.g., data structures, objects, values, variables, etc.) may be initialized, retrieved, or accessed for use in logic 1200. At 1204, a request is received to initiate a virtual meeting session involving a plurality of endpoints. At 1206, a location identifier is determined for each of the plurality of endpoints based on location data received from one or more communication devices on each of the plurality of endpoints. At 1208, it is determined that two or more of the plurality of endpoints are co-located at a same location based on the location identifier for each of the plurality of endpoints. At 1210, only one connection is established to the virtual meeting session on behalf of the two or more of the plurality of endpoints. The only one connection is established with the only one of the two or more of the plurality of endpoints. Users associated with (via a user profile) the two or more of the plurality of endpoints may be included in a list of participants that are present in the virtual meeting based on the establishment of the only one connection with the only one endpoint. Prior to automatically establishing the only one connection between the meeting management server and the only one of the two or more of the plurality of endpoints a log of past virtual meeting sessions may be used to identify which of the two or more of the plurality of endpoints should receive the only one connection. For example, the log may be accessed from accessing from database 134 (FIG. 1). The log may be queried to identify any past virtual meeting session that involve the co-located endpoints (i.e., the two or more of the plurality of endpoints). The only one endpoint may be selected based on the log. For example, number of times that each of the two or more of the plurality of endpoints has initiated the past virtual meeting sessions can be determined from the log. The only one of the two or more of the plurality of endpoints is selected based on having initiation a larger number of the past virtual meeting sessions than others of the two or more of the plurality of endpoints. In other examples, the log may be used to determine if any of the co-located endpoints (or users) has previously joined a virtual meeting session on behalf of other endpoints (or users) involved. If one user has done so more than others of the co-located participants, than an endpoint corresponding to that user is selected for being connection on behalf of the others. At 1212, others of the two or more of the plurality of endpoints are prevented from connecting to the virtual meeting session. The logic 1200 ends at 1214. 1214 may coincide with a start or end point of other logic, routines, and/or applications.

The logic 1200 of FIG. 12 is an example of the logic 1000 of FIG. 10. For example, 1004 of the logic 1000 corresponds to 1204 of the logic 1200; 1006 of the logic 1000 corresponds to 1206 and 1208 of the logic 1200; and 1008 of the logic 1000 corresponds to 1210 and 1212 of the logic 1200.

It is noted that logic 1100 and 1200 may be used together with one another. Example, one network element may implement both logic 1100 and logic 1200 and selectively choose which to execute based on the options available for the co-located users. For example, when it is determined that a conferencing device is available at the location at which the endpoints are co-located, the logic 1100 (at least in part) is executed to connect the co-located endpoints to the conferencing device. Alternatively, when it is determined that a conferencing device is not available at the location at which the endpoints are collocated, the logic 1200 (at least in part) is executed to connect to only one of the co-located endpoints on behalf of all the co-located endpoints (using a log of historical data regarding past virtual meeting sessions).

Figure 13A:
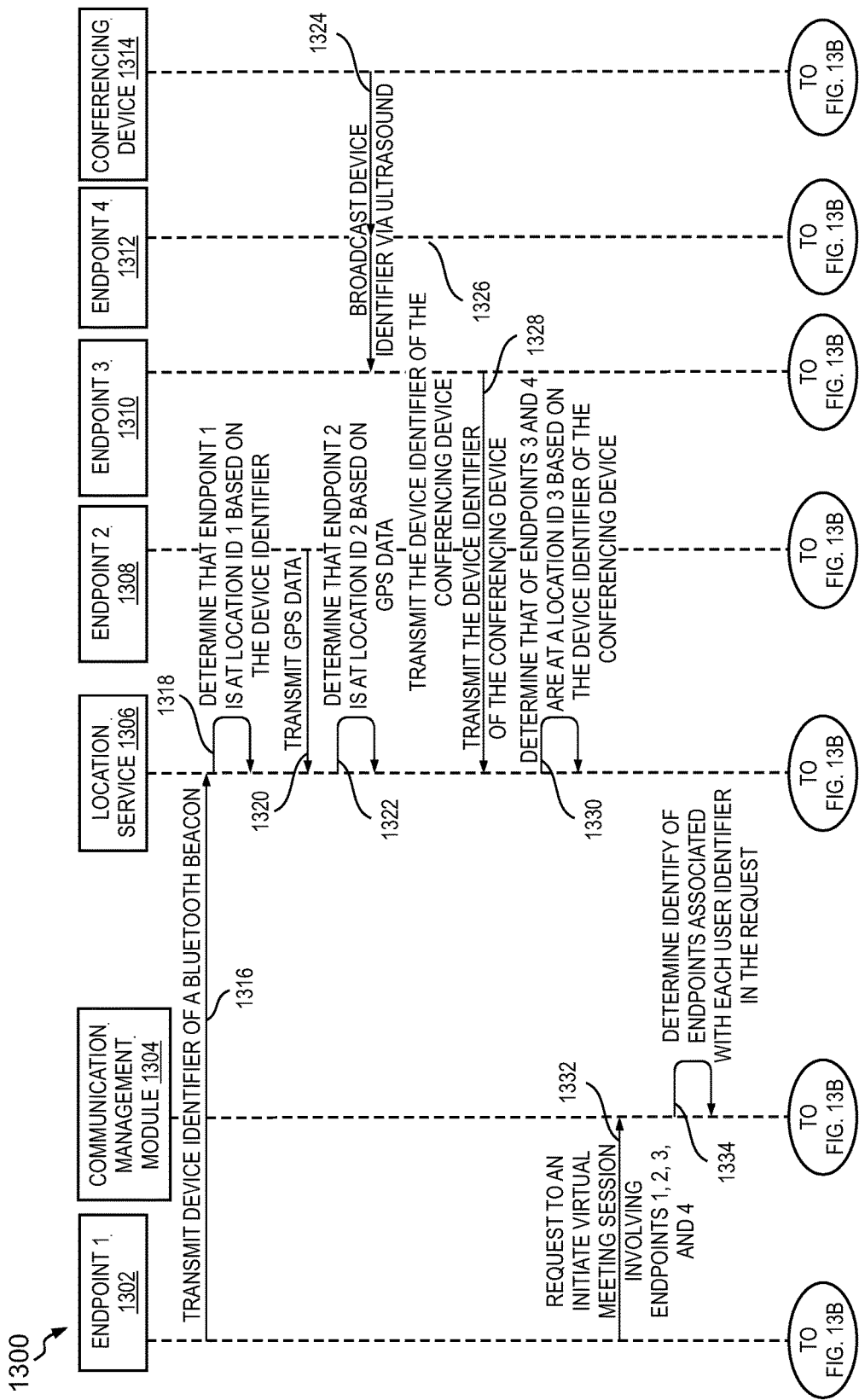
FIGS. 13A and 13B are a simplified diagram illustrating data transmitted between components of a system according to some embodiments of the present disclosure.
Figure 13B:
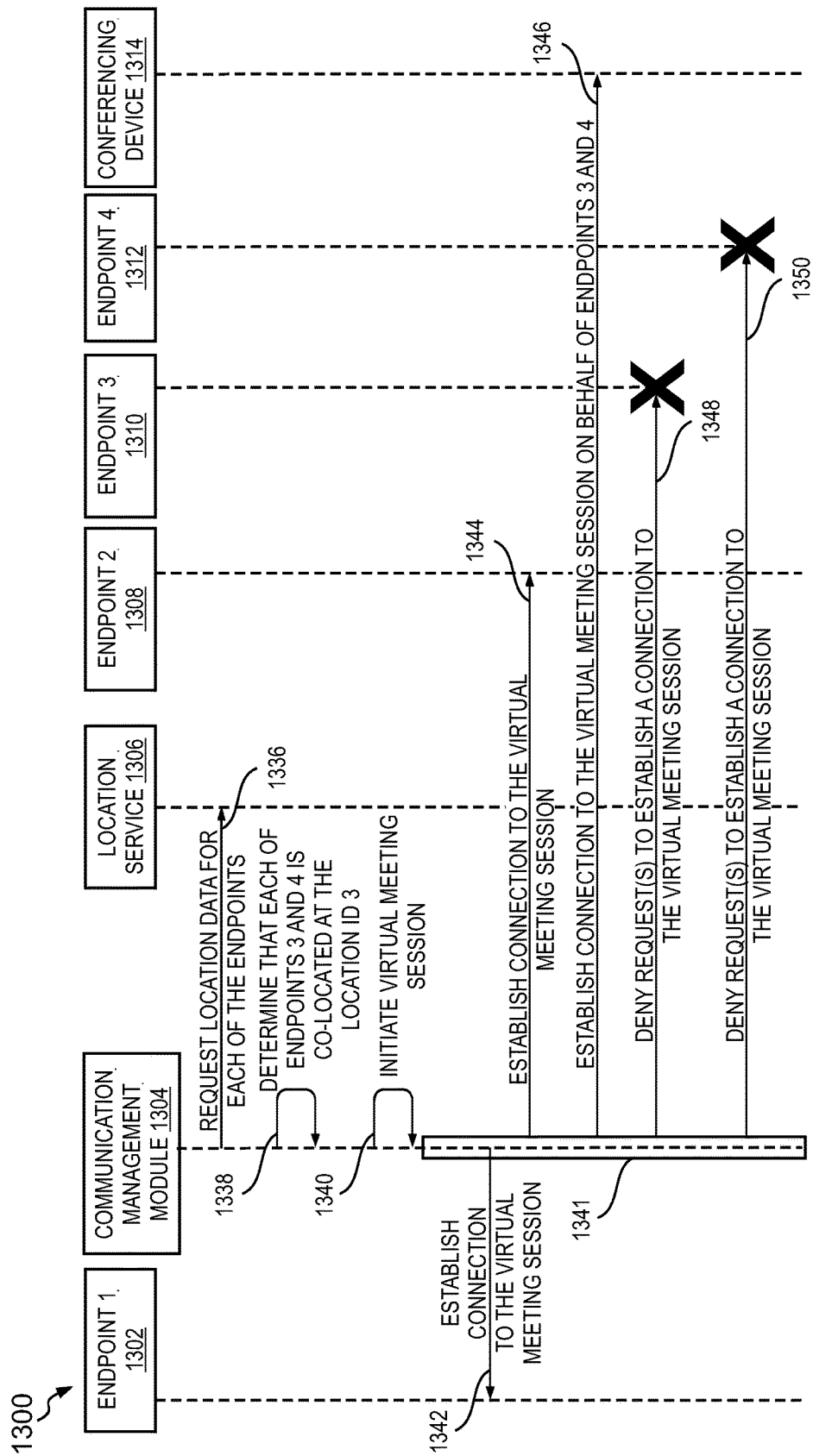

Turning to FIGS. 13A and 13B, FIGS. 13A and 13B are a simplified diagram illustrating data transmitted between components of a system (i.e., system 1300) according to some embodiments of the present disclosure. The system 1300 comprises a first endpoint 1302, a connection management module 1304, a location service 1306, a second endpoint 1308, a third endpoint 1310, a fourth endpoint 1312, and a conferencing device 1314. The connection management module 1304 may be located in a network element such as a server (e.g., a meeting management server).

The location service 1306 utilizes location data to determine the location of each of the endpoints (i.e., 1302, 1308, 1310, 1312). The location service may utilize a mapping between device identifiers and location identifiers to determine the location of the endpoints. The mapping may include device identifiers (and corresponding location identifiers) for Bluetooth beacons, conferencing devices, NFC devices, or any other communication devices with which the endpoints may communicate to generate location data. Turning to FIG. 13A, at 1316, the endpoint 1302 transmits a device identifier of a Bluetooth beacon to the location service 1306 in this example, the first endpoint 1302 may have detected that the device identifier of the Bluetooth begin using a Bluetooth receiver located locally on the first endpoint 1302. The location service 1306 uses the device identifier (i.e., location data) to determine the location of the first endpoint. Thus, at 1318, the location service 1306 determines that the first endpoint is at a location ID 1 based on the device identifier of the Bluetooth (received at 1316). At 1320, the second endpoint 1308 transmits GPS data to the location service 1306. Again, the location service 1306 uses the GPS data (i.e., location data) to determine the location of the second endpoint. Thus, at 1322, the location service 1306 determines that the second endpoint is at a location ID 2 based on based on GPS data (received at 1320). At 1324 and ultrasound transmitter located on the conferencing device 1314 broadcasts, encoded in an ultrasound transmission, a device identifier of the conferencing device 1314. Each of the third and fourth endpoints (i.e., 1310 and 1312) receive a ultrasound transmission is encoded with the device identifier of the conferencing device 1314. In addition, each of the third and fourth endpoints transmit to location service the device identifier of the conferencing device (i.e., location data). At 1326, the fourth endpoint transmits the device identifier of the conferencing device to the location service 1306. At 1328, the third endpoint transmits the device identifier of the conferencing device to the location service 1306. Again, the location service 1306 uses the device identifier of the conferencing device (i.e., location data) to determine the location of each of the third and fourth endpoints. At 1330, the location service 1306 determines that each of the third and fourth endpoints are at a location ID 3 based on the device identifier of the conferencing device. The location ID 3 is derived from the location of the conferencing device 1314 from which the device identifier was received by each of the third and fourth and points (i.e., at 1324). In this example, the location service 1306 looked up the device identifier of the conferencing device in the mapping and determined the location identifier that corresponds to the device identifier of the conferencing device 1314.

This above is one example of operations that the location service 1306 may perform to determine the location of each of the endpoints. The location service may continually update the location of each of the endpoints based on periodically receiving updated location data from each endpoint. Moreover, this example illustrates that the locations are calculated before the start of a request for a virtual meeting session. However, in other embodiments of the present disclosure, similar location checks may be periodically performed throughout the duration of the virtual meeting session (to determine updated location identifiers (location IDs) for each endpoint).

When establishing a virtual meeting session, the connection management module 1304 can utilize the location information determined from the location service 1306. As discussed around present specification, the location servers 1306 they synthesize location data gathered from many different sources. The connection management module 1304 leverages the location data synthesized by the location service to determine whether endpoints (end/or users) involved in a virtual meeting session are co-located with one another.

At 1332, the connection management module 1304 receives a request to initiate virtual meeting session involving the first, second, third, and fourth endpoints. For example, such a request may be received from an interface similar to that described with respect to FIG. 3. In such an example, the request may not explicitly identify endpoints and may, instead, include a user identifiers for each user that is to be involved in the meeting session. The request may be received using 1004 of logic 1000, 1104 of logic 1100 or, 1204 of logic 1200. Thus, at 1334, the connection management module 1304 can determine an identity of the endpoints associated with each user identifier in the request. In effect, this translates the user identifiers to device identifiers of endpoints for which the location can be requested from the location service 1306. Turning to FIG. 13B, at 1336, the connection management module 1304 requests location data and/or location identifiers for each of the endpoints identified at 1334. Once the connection management module 1304 has the location data and/or location identifiers for each of the endpoints involved in the virtual meeting session, the location data and/or the location identifiers are compared to determine whether any of the endpoints are at a same location (i.e., are co-located). At 1338, the connection management module 1304 determines that each of third and fourth endpoints is co-located at the location ID 3. In addition, the connection management module 1304 determines that each of the first and the second endpoints are knuckle located with any other endpoints involved in the virtual meeting session. 1334, 1336, and 1338 corresponds to 1006 of logic 1000. 1334 and 1336 corresponds to 1106 of logic 1100 and/or 1206 of logic 1200. 1338 corresponds to 1108 of logic 1100 and/or 1208 of logic 1200.

Once the determination has been made regarding whether or not endpoints involved in virtual meeting session are: located, the connection management module initiates connections to the endpoints and/or on behalf of the endpoints. At 1340, the connection management module 1304 initiates a virtual meeting session 1341 based on the request 1336. Because each of the first endpoint and the second endpoint are determined to not be co-located with any other endpoints, connections are directly established with these endpoints.

At 1342, the connection management module 1304 establishes a connection for the first endpoint to connect to the virtual meeting session. At 1344, the connection management module 1304 establishes a connection for the second endpoint to connect to the virtual meeting session. Each of these connections (i.e., those established at 1342 and 1344) is established directly to the respective endpoints. In contrast, because each of the third and the fourth endpoints are determined to be co-located with one another, connections are not directly established with these endpoints. Instead, a single connection is established to the conferencing device 1314 on behalf of the co-located endpoints (i.e., the third and fourth endpoints). The connection management module 1304 may select the conferencing device based on the conferencing device being located at the location ID 3.

At 1346, the connection management module 1304 establishes, with the conferencing device 1314, only one connection to the virtual meeting session on behalf of third and the fourth endpoints. Thus, the connection management module 1304 can reduce the number of connections established for virtual meeting session by consolidating several co-located users into a single connection to a single device. Consequently, once this connection is establish based on the co-location of several endpoints, any other connections on behalf of those endpoints may be prevented to reduce the likelihood of creating superfluous connections for those endpoints. Thus, at 1348, the connection management module 1304 denies request(s) to establish a connection to the virtual meeting session from the third endpoint. At 1350, the connection management module 1304 denies request(s) to establish a connection to the virtual meeting session from the fourth endpoint.

In further examples, instead of connecting to the conferencing device 1314 (at 1346), the connection management module may establish a connection to only one of the third or the fourth endpoint. For example, the connection management module 1304 may use a log of past virtual meetings to determine that the third endpoint is typically the one that initiates meetings between this group of endpoints (i.e., endpoints 1302, 1308, 1310, 1312). Thus the connection management module 1304 may select a third endpoint to establish a connection on behalf of both the third and the fourth endpoint (i.e., based on the third endpoint's historical role as the initiator of virtual meetings between the group).

Note that in certain example implementations, the connection management functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element can store data used for the operations described herein. This includes the memory element being able to store software, logic, code, or processor instructions that can be executed to carry out the activities described in this Specification. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

In one example implementation, connectivity management module includes software in order to achieve the endpoint identification functions outlined herein. These activities can be facilitated by MCSs/MCC 144 and/or the various endpoints 112a-k. MCSs/MCC 144 and/or endpoints 112a-k can include memory elements for storing information to be used in achieving the connection management functions, as outlined herein. Additionally, MCSs/MCC 144 and/or endpoints 112a-k may include a processor that can execute software or an algorithm to perform the connection management controls, as discussed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any possible memory items (e.g., database, table, cache, etc.) should be construed as being encompassed within the broad term 'memory element.' Similarly, any of the potential processing elements, modules, and machines described in this Specification should be construed as being encompassed within the broad term 'processor.'

Note that with the examples provided herein, interaction may be described in terms of two or three elements. However, this has been done for purposes of clarity and example only. In certain cases, it may be easier to describe one or more of the functionalities of a given set of flows by only referencing a limited number of network elements. It should be appreciated that communication system 100 (and its teachings) are readily scalable and can accommodate a large number of rooms and sites, as well as more complicated/sophisticated arrangements and configurations. Accordingly, the examples provided herein should not limit the scope or inhibit the broad teachings of communication system 100 as potentially applied to a myriad of other architectures. Additionally, although described with reference to particular scenarios where MCSs/MCC 144 resides in a particular physical location, MCSs/MCC 144 can reside in any location, provided it has some connectivity to a suitable network.

It is also important to note that the steps discussed with reference to the FIGS. 1-12 illustrate only some of the possible scenarios that may be executed by, or within, communication system 100. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular embodiments, it should be understood that various other changes, substitutions, and alterations may be made hereto without departing from the spirit and scope of the present disclosure. For example, although the present disclosure has been described as operating in virtual meeting and virtual conferencing environments or arrangements, the present disclosure may be used in any online environment that could benefit from such technology. Virtually any configuration that seeks to intelligently management connections for endpoints users could enjoy the benefits of the present disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims. The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. A method comprising:
receiving, from an endpoint, a request to initiate a virtual meeting session involving a plurality of endpoints;
reducing a number of connections established by a server for the virtual meeting session by:
determining a location identifier for each of the plurality of endpoints based on location data generated by each of the plurality of endpoints; and
based on determining that two or more of the plurality of endpoints are co-located at a location based on the location identifier:
selecting, from the two or more of the plurality of endpoints, only one endpoint that has initiated a larger number of past virtual meeting sessions than others of the two or more of the plurality of endpoints, and
automatically establishing only one connection between the server and the only one endpoint on behalf of the two or more of the plurality of endpoints.

2. The method of claim 1, further comprising:
preventing each of the others of the two or more of the plurality of endpoints from connecting to the virtual meeting session based on the only one connection between the server and the only one endpoint being established on behalf of the two or more of the plurality of endpoints.

3. The method of claim 2, further comprising:
generating a list of participants involved in the virtual meeting session, wherein the list of participants identifies participants associated with each of the two or more of the plurality of endpoints, wherein the participants associated with each of the two or more of the plurality of endpoints are identified, in the list of participants, as being connected to in the virtual meeting session.

4. The method of claim 1, wherein each of the plurality of endpoints comprises an ultrasound receiver, and the ultrasound receiver received the location data in an ultrasound signal from a conferencing device.

5. The method of claim 1, further comprising:
prior to automatically establishing the only one connection between the server and the only one endpoint:
comparing audio/video ("A/V") characteristics of each of the two or more of the plurality of endpoints, and
selecting the only one endpoint based, at least in part, on the A/V characteristics of the only one endpoint being more highly ranked than the others of the two or more of the plurality of endpoints.

6. The method of claim 1, further comprising:
prior to automatically establishing the only one connection between the server and the only one endpoint:
accessing, from the server, a log of the past virtual meeting sessions involving the plurality of endpoints,
determining, from the log, a number of times that each of the two or more of the plurality of endpoints has initiated the past virtual meeting sessions, and
determining that the only one endpoint has initiated the larger number of the past virtual meeting sessions than the others of the two or more of the plurality of endpoints.

7. The method of claim 1, wherein the location data comprises a device identifier detected by one or more wireless communication devices on each of the plurality of endpoints, and the determining the location identifier for each of the plurality of endpoints based on location data generated by each of the plurality of endpoints comprises:
retrieving the location identifier based on a mapping of device identifiers to location identifiers and the device identifier.

8. The method of claim 7, wherein each of the one or more wireless communication devices is selected from the group consisting of a global positioning system (GPS) receiver, a Bluetooth receiver, and an ultrasound receiver.

9. The method of claim 1, further comprising:
determining an updated location identifier for an endpoint of the others of the two or more of the plurality of endpoints based on updated location data received from one or more wireless communication devices on the endpoint;
upon detecting that the endpoint is no longer at the location based on the updated location identifier, transmitting, to the endpoint, a request to establish a connection between the endpoint and the server.

10. The method of claim 1, further comprising:
determining an updated location identifier for an endpoint of the plurality of endpoints based on updated location data received from one or more wireless communication devices on the endpoint;
upon detecting that the endpoint is at the location based on the updated location identifier, automatically terminating a connection between the endpoint and the server based on the endpoint being co-located at the location with the two or more of the plurality of endpoints.

11. The method of claim 1, wherein the virtual meeting session comprises an audio steam and a video stream from the server and the only one connection accesses the audio steam and the video stream of the virtual meeting session from the server.

12. A server comprising:
at least one network interface configured to receive, from an endpoint, a request to initiate a virtual meeting session involving a plurality of endpoints;
one or more processor operably coupled to the at least one network interface and a connection management module;
the connection management module comprising instructions that, when executed by the one or more processor, reduce a number of connections established by the server for the virtual meeting session by performing operations comprising:
determining a location identifier for each of the plurality of endpoints based on location data generated by each of the plurality of endpoints; and
based on determining that two or more of the plurality of endpoints are co-located at a location based on the location identifier:
selecting, from the two or more of the plurality of endpoints, only one endpoint that has initiated a larger number of past virtual meeting sessions than others of the two or more of the plurality of endpoints, and
automatically establishing only one connection between the server and the only one endpoint on behalf of the two or more of the plurality of endpoints.

13. The server of claim 12, wherein the operations further comprise:
prior to automatically establishing the only one connection between the server and the only one endpoint:
accessing, from the server, a log of the past virtual meeting sessions involving the plurality of endpoints,
determining, from the log, a number of times that each of the two or more of the plurality of endpoints has initiated the past virtual meeting sessions, and
determining that the only one endpoint has initiated the larger number of the past virtual meeting sessions than the others of the two or more of the plurality of endpoints.

14. The server of claim 12, wherein the operations further comprise:
preventing each of the others of the two or more of the plurality of endpoints from connecting to the virtual meeting session based on the only one connection between the server and the only one endpoint being established on behalf of the two or more of the plurality of endpoints.

15. The server of claim 12, wherein the location data comprises a device identifier detected by one or more wireless communication devices on each of the plurality of endpoints, and the determining the location identifier for each of the plurality of endpoints based on location data generated by each of the plurality of endpoints comprises:

retrieving the location identifier based on a mapping of device identifiers to location identifiers and the device identifier.

16. The server of claim 15, wherein each of the one or more wireless communication devices is selected from the group consisting of a global positioning system (GPS) receiver, a Bluetooth receiver, and an ultrasound receiver.

17. A computer-readable non-transitory medium comprising instructions, that when executed by at least one processor configure the at least one processor to perform operations comprising:
  receiving, from an endpoint, a request to initiate a virtual meeting session involving a plurality of endpoints;
  reducing a number of connections established by a server for the virtual meeting session by:
    determining a location identifier for each of the plurality of endpoints based on location data generated by each of the plurality of endpoints; and
    based on determining that two or more of the plurality of endpoints are co-located at a location based on the location identifier:
      selecting, from the two or more of the plurality of endpoints, only one endpoint that has initiated a larger number of past virtual meeting sessions than others of the two or more of the plurality of endpoints, and
      automatically establishing only one connection between the server and the only one endpoint on behalf of the two or more of the plurality of endpoints.

18. The computer-readable non-transitory medium of claim 17, wherein the operations further comprise:
  prior to automatically establishing the only one connection between the server and the only one endpoint:
    accessing, from the server, a log of the past virtual meeting sessions involving the plurality of endpoints,
    determining, from the log, a number of times that each of the two or more of the plurality of endpoints has initiated the past virtual meeting sessions, and
    determining that the only one endpoint has initiated the larger number of the past virtual meeting sessions than others of the two or more of the plurality of endpoints.

19. The computer-readable non-transitory medium of claim 17, wherein the operations further comprise:
  preventing each of the others of the two or more of the plurality of endpoints from connecting to the virtual meeting session based on the only one connection between the server and the only one endpoint being established on behalf of the two or more of the plurality of endpoints.

20. The computer-readable non-transitory medium of claim 17, wherein the location data comprises a device identifier detected by one or more wireless communication devices on each of the endpoints, and the determining the location identifier for each of the plurality of endpoints based on location data generated by each of the plurality of endpoints comprises:
  retrieving the location identifier based on a mapping of device identifiers to location identifiers and the device identifier.

* * * * *